United States Patent
Boutin et al.

(10) Patent No.: US 7,403,850 B1
(45) Date of Patent: Jul. 22, 2008

(54) AUTOMATED FAULT DIAGNOSIS METHOD AND SYSTEM FOR ENGINE-COMPRESSOR SETS

(75) Inventors: Benjamin J. Boutin, Weston, FL (US); Robert J. Webber, Jr., Olathe, KS (US); Ferdinand G. Oliva, Coral Springs, FL (US); John F. Kealty, Coral Springs, FL (US); Javier Fernandez, Miami, FL (US); Thomas J. Kitchens, Coral Springs, FL (US)

(73) Assignee: Dynalco Controls Corporation, Ft. Lauderdale, FL (US)

( * ) Notice: Subject to any disclaimer, the term of this patent is extended or adjusted under 35 U.S.C. 154(b) by 83 days.

(21) Appl. No.: 11/537,136

(22) Filed: Sep. 29, 2006

Related U.S. Application Data

(60) Provisional application No. 60/721,643, filed on Sep. 29, 2005.

(51) Int. Cl.
*G06F 7/70* (2006.01)
(52) U.S. Cl. .................................. 701/107; 73/35.01
(58) Field of Classification Search ................ 701/104, 701/107, 110, 113, 114; 73/35.01–35.09
See application file for complete search history.

(56) References Cited

U.S. PATENT DOCUMENTS

| | | | | |
|---|---|---|---|---|
| 4,345,558 | A * | 8/1982 | Yamaguchi et al. | 123/406.35 |
| 5,230,316 | A * | 7/1993 | Ichihara et al. | 123/406.38 |
| 5,322,047 | A | 6/1994 | Oliu et al. | |
| 5,647,579 | A * | 7/1997 | Satoh | 267/140.14 |
| 5,736,937 | A | 4/1998 | McGirr et al. | |
| 6,292,757 | B1 | 9/2001 | Flanagan et al. | |
| 6,485,265 | B2 | 11/2002 | Schroeder et al. | |
| 6,567,709 | B1 | 5/2003 | Malm et al. | |
| 6,687,654 | B2 | 2/2004 | Smith, Jr. et al. | |
| 6,863,034 | B2 * | 3/2005 | Kern et al. | 123/3 |
| 6,876,919 | B2 | 4/2005 | James et al. | |
| 7,055,492 | B2 * | 6/2006 | Yamaoka et al. | 123/295 |
| 7,056,097 | B2 | 6/2006 | Lake | |
| 2006/0117834 | A1 * | 6/2006 | Goto | 73/35.09 |

OTHER PUBLICATIONS

Dynalco RECIP-TRAP 3260 product spec, Jul. 2006.
Windrock, Inc. 6310 Analyzer and On-Guard monitor 3300 spec sheets, 14 pages, Sep. 11, 2006.
Dynalco RECIP-TRAP 3260 product spec, Jul. 2006.
Windrock, Inc. 6310 Analyzer and On-Guard monitor 3300 spec sheets, 14 pages, Sep. 11, 2006.

* cited by examiner

*Primary Examiner*—Willis R. Wolfe, Jr.
*Assistant Examiner*—Johnny H Hoang
(74) *Attorney, Agent, or Firm*—Robert C. Kain, Jr.; Fleit Kain

(57) ABSTRACT

The automated fault diagnostic system operates on engine-compressor sets with one vibration sensor per sub-group of engine cylinders and one sensor per compressor cylinder. Vibration signals linked to crankshaft phase angle windows ("VT") mark various engine events and compressor events. In data-acquisition-learning mode, VT is stored for each engine and compressor event per operating load condition, statistical process control (SPC) theory identifies alarm threshold bands. Operator input-overrides are permitted. If no baseline data is stored, the system automatically enters the learn mode. To monitor, current VT are obtained and current load condition is matched to the earlier load set and alarms issue linking predetermined engine or compressor event to the over-under VT. Baseline data, SPC analysis, alarms and monitoring are set for crankcase flow, engine cylinder exhaust temperatures, ignition system diagnostic messages. Compressor performance alarms use suction and discharge temperatures and pressures.

38 Claims, 9 Drawing Sheets

AUTOMATED FAULT DIAGNOSIS METHOD AND SYSTEM FOR ENGINE-COMPRESSOR SETS

The present application claims priority of provisional patent application Ser. No. 60/721,643, filed on Sep. 29, 2005.

The present invention relates to an automated fault diagnosis method and system for a reciprocating, multiple cylinder engine driving a reciprocating, multiple cylinder compressor.

BACKGROUND OF THE INVENTION

Large internal combustion engines are employed to drive large, multi-cylinder compressors which compressors are used in the transport of gas, such as natural gas, oil or slurry. Existing systems are adequate for basic monitoring and fault diagnosis. Current fault diagnosis of the engine-compressor sets is done by a highly trained, machinery analyst.

A typical industry employing these multi-cylinder engine-compressor sets is the gas gathering industry. Large bore, integral compressors in the gas transmission industry are not a good fit for the present diagnostic monitoring system since these large bore, integral compressor units are normally fully automated and do not need further diagnostic devices.

Typical engine-compressor sets are mechanically coupled together and mounted on a skid. The internal combustion engine drives the gas compressor. Some applications may be motor-driven. The compressor will often be 3 stage with 4 throws having 8 valves on the low stage cylinders and 4 valves on the high stage cylinders. The engine will often be a 12 cylinder internal combustion engine manufactured by White, Waukesha or Caterpillar. A typical configuration is an engine with 12 power cylinders driving 4 compressor cylinders with 8 valves per compressor cylinder, and 3 compressor stages. Less common configurations are engines with 12 power cylinders driving 6 compressor cylinders with 8 valves per cylinder, 3 stages.

The machines are often started manually and have manual loading/unloading control devices.

Windrock has a prior art device which records pressure and temperature and, after an informal investigation, has no automated diagnostics. This Windrock system can also record vibration and pressure from power or engine cylinders. It is generally used as part of closed loop control system for the engine-compressor set.

Prognost (Kotter) in Reine Germany also has an online compressor monitoring system. In the Prognost system, engines are not monitored. The Prognost system has some basic diagnostics of compressor vibration using an external PC. The Prognost system also compares current compressor data to baseline compressor data. The Prognost system includes the concept of delineation of compressor operating conditions. In the Prognost system, setup is manual, not automatic, and there is no baseline data acquisition or "Learn" mode. The Prognost system records compressor pressure data for the compressor analysis. The Prognost system does not use compressor performance curves to determine the expected performance of the compressor. The target market for the Prognost system is large critical compressors in refineries.

U.S. Pat. No. 6,567,709 to Malm discloses an integrated monitoring, diagnostics, shut-down and control system for machinery with reciprocating pistons, such as reciprocating engines, reciprocating compressors used for compressing gases, and reciprocating pumps used for pumping liquids. One use of the Malm monitoring/evaluation process is the implementation of a predictive maintenance scheme which extends the life cycle of consumable mechanical components. The benefit is seen in cost reduction, as the use of a regular maintenance schedule often does not utilize the full operating life of consumable components. A number of sensors are used including low data rate sensors for pressures and gas flow and fuel flow (state and process parameters) and a number of high data rate sensors such as accelerometers (for vibration measurement). The electronic system stores and calculates values and statistical information in memory. The storing operation may be done periodically and the information may be stored for a predetermined period. For example, calculated values are typically stored every hour, and kept in the memory for 30 days or more. Since some of the pressures and gas flow and fuel flow (state and process parameters) processes can be updated on-line, the calculation can be customized for different applications. The preferred embodiment includes one or more of the following calculations: peak value, indicated power, efficiency, rod load, flow, valve loss, signal smoothing, vibration statistics and others. A human interface unit is provided and final calculations are tabulated, time stamped and posted to output registers. In this way, final calculated values are made available to the human interface unit display. The tabulated data has an associated Avg/Max/Min/St. Dev. appropriate to the characteristic calculation. Only these summary values will be forwarded to the software for storage. The user configures warning and min and max warning boundaries and alarm boundaries. The prime function of the system is a controller to calculate control algorithm set-points and outputs for controlling the machinery. A number of control loops are be defined the ability to use several independent PID (proportional, integral and derivative) algorithms for the control functions.

U.S. Pat. No. 6,687,654 to Smith discloses techniques for monitoring power generators, assembly line equipment, and power train equipment, such as transmissions, for delivering power to assembly line equipment. The machine is monitored for significant deviations from normal operations and the disclosed system includes collecting, at a first processing element, sensor data about the machine. The first processing element performs narrowband frequency domain processing to determine a segment of sensor data that indicates a deviation from normal operations that exceeds a threshold deviation. A message including the segment of sensor data is sent to a second processing element. In response to receiving the message, the second processing element performs different narrowband frequency domain processing to determine whether the deviation from normal operations is significant for maintaining the machine. If the deviation from normal operations is determined to be significant for maintaining the machine, then the deviation is reported to cause the machine to be maintained. After characteristics of peaks and tracks have been accumulated from rotational machinery acoustic signatures, those characteristics are used to classify machine operations into one of several classes, including a normal operations class and several failure modes classes. Each failure mode is associated with one or more defective components. Each of the classes may be defined automatically based on processing during training operations, or may be defined in concert with human analysts, or may be defined exclusively by human analysts. An alert indicating the occurrence of deviations classified as one or more conditions for maintenance is sent to an alert unit coupled to the first processing element over a communications channel such as the Internet. In some embodiments, the alert is sent in a message along with other information, such as data indicating the classification and the component part whose failure is associated with the classification. In some embodiments, a warning is sent when persistent deviations are found that do not match any signatures in the database of known failure modes. A human analyst can determine whether to add the new signature as a new failure mode associated with one or more components.

U.S. Pat. No. 6,292,757 to Flanagan discloses a method and an apparatus for continuously monitoring compressor parameters of reciprocating compressor cylinders with a plurality of sensors positioned to monitor selected parameters within the cylinder on either side of the piston, with the selected parameters including pressures on each side of the piston for each cycle, temperatures of the gas entering and exiting the cylinder, and vibrations of components such as a piston shaft within the cylinder.

U.S. Pat. No. 5,736,937 to McGirr discloses an apparatus for wireless transmission of shaft position information. The apparatus conveys real time shaft position information, without cables, between a stationary sensor connected to a reciprocating engine or compressor, or other rotating machinery, and an engine analyzer, in the presence of high energy ignition voltages employs a combination of conventional and non-conventional radio frequency technologies and digital signal processing to both encode and accurately reproduce real time shaft position information.

SUMMARY OF THE INVENTION

The automated fault diagnosis method and system operates in connection with a reciprocating, multiple cylinder engine driving a reciprocating, multiple cylinder compressor. Groups of cylinders are identified in the engine and a plurality of vibration sensors, one for each group, detects engine vibrations. A sensor detects a plurality of predetermined phase angle windows about crankshaft angular positions for a corresponding plurality of predetermined engine events per engine cylinder. In a baseline data acquisition mode ("learning" mode), the method and system stores respective vibration signals for each phase angle window corresponding to the plurality of predetermined engine events per engine cylinder and for a plurality of engine load operating conditions other than startup and shutdown conditional states. The predetermined engine conditions may be less than 90% of normal load, 90-100% load and over 100% load engine conditions. Other ranges are configurable by the user. Statistical characteristics of the phase angle vibratory signals are calculated during the baseline data acquisition mode corresponding to the predetermined engine events for each engine operating condition. Alarm thresholds are assigned for the vibration signals per phase angle window per predetermined engine event per engine cylinder for each engine operating condition based upon statistical characteristics. This learning process is automated, with some operator input—override permitted. If no baseline data is stored, the diagnostic system automatically enters the Learn mode for the signal, engine event, engine cylinder and operation condition. In a monitoring mode, the current vibration signals are obtained for each phase angle window and the current engine operating condition is matched to one of the earlier set plurality of engine operating conditions. An alarm is issued unique to the predetermined engine event per cylinder per load condition when the vibration signal corresponding to the engine event and engine operating condition exceeds an alarm threshold. Thresholds are typically statistically set. A flow measurement device (generally pressure) is mounted on the engine crankcase and crankcase flow signals are monitored corresponding to each engine operating condition. A combustion flow alarm threshold is assigned based upon statistical analysis of crankcase flow signals and, in a monitoring mode, a combustion flow alarm is issued when the crankcase flow signals for the matching engine operating condition exceeds thresholds. Engine exhaust temperatures are obtained and an alarm is issued when exhaust temperature signals exceed statistically gathered and assigned alarm thresholds.

With respect to the compressor, the compressor includes a suction manifold and discharge manifold. Suction and discharge temperature sensors and suction pressure sensors and a discharge pressure sensors supply data to the diagnostic system. Calculations are made based upon manifold suction and discharge temperature signals for each stage, suction pressure signals for each stage, discharge pressure signals for each stage, and speed signals representing the rotational speed of the compressor. A plurality of operating compressor conditions other than startup and shutdown operating conditions are monitored and calculations for capacity per stage, brake horsepower, brake horsepower per unit per time period per stage and total capacity and total brake horsepower per unit volume throughput (BHP/MMSCFD) are calculated for the compressor. Compressor performance alarm thresholds are established upon statistical characteristics and a compressor performance alarm is issued when the current compressor performance matching the operating compressor condition exceeds the compressor performance alarm thresholds. Also, the compressor has a plurality of vibration sensors mounted thereon, a single sensor mounted on a respective compressor cylinder of the multiple cylinder compressor system. Vibration signals per phase angle windows corresponding to predetermined compressor valve events for each operating compressor condition are analyzed for fault conditions. Compressor valve alarm thresholds are statistically calculated and, in the monitoring mode, alarms are issued for compressor valve events.

Returning to the engine diagnostic method and system, the engine control system includes an ignition diagnostic messages that indicate the condition of the ignition signal for the engine. The fault diagnosis method and system obtains diagnostic messages generated from the Altronic CPU ignition system and displays them locally and remotely, and issues an ignition alarm when the ignition diagnostic signal is not behaving normally.

OBJECTS OF THE INVENTION

The diagnostic monitoring system of the present invention continuously monitors and diagnoses engines and compressors and engine-compressor sets. The system evaluates the current state of the engine and compressor against baseline data and issues an alert if there is a significant deviation between the current and expected data.

The diagnostic monitoring system concept can be applied to other engines or compressors outside the oil & gas industry. The diagnostic monitoring system concept can also be applied to other types of machines that generate vibrations, pressures, temperatures and fluid flows within a range that is predictable when the machine is running.

The current version of the diagnostic system accommodates 10 cylinder compressors and accommodates 16 cylinder engines. A typical configuration subject to the diagnostic system of the present invention is an engine with 12 power cylinders driving 4 compressor cylinders with 8 valves per cylinder, 2 stages. Less common configurations are engines with 12 power cylinders driving 6 compressor cylinders with 8 valves per cylinder, 3 stages. Rarely, the diagnostic system accommodates 16 power cylinders driving 6 compressor cylinders with 8 valves per cylinder, 3 stages. The design for the diagnostic system accommodates is 16 power cylinders, 10 compressor cylinders, 5 stages with a plurality of valves per compressor cylinder.

The machines are often started manually and have manual loading/unloading control devices. The present diagnostic monitoring system does not deal with start-up nor shut down cycles.

Principal functions and objectives of the diagnostic monitoring system are set forth below.

It is an object of the present invention to automate fault diagnosis in monitoring systems. This is the most significant differentiation with respect to the present inventive monitoring system.

It is another object of the present invention to organize and consolidate field data to improve decision-making. There is currently too much information being ignored because it is not in a form that is easily used.

It is a further object of the present invention to reduce the number of operator call-outs.

It is an additional object of the present invention to increase machinery reliability by detecting incipient failures so that corrective action can be taken. Some components on the engine and compressor are responsible for the majority of the call-out problems.

It is an object of the present invention to warn operators if the equipment is run in unacceptable operating modes.

It is an object of the present invention to drive data into financial measures.

It is an object of the present invention to change the engine/compressor maintenance paradigm from time based event to a condition based event.

It is an object of the invention to improve the economic performance of the engine-compressor set, and fuel consumption, reduce labor maintenance time and change the "fix when broke" process to a pro-active, monitor and plan maintenance program. These economic measures concerning the engine and compressor performance improve the profitability the operating company.

BRIEF DESCRIPTION OF THE DRAWINGS

Further objects and advantages of the present invention can be found in the detailed description of the preferred embodiments when taken in conjunction with the accompanying drawings, in which:

FIG. 8 diagrammatically illustrates the setting of alarm levels for a particular monitored signal.

DETAILED DESCRIPTION OF THE PREFERRED EMBODIMENTS

The present invention relates to an automated fault diagnosis method and system for a reciprocating, multiple cylinder engine driving a reciprocating, multiple cylinder compressor.

Figure 1:
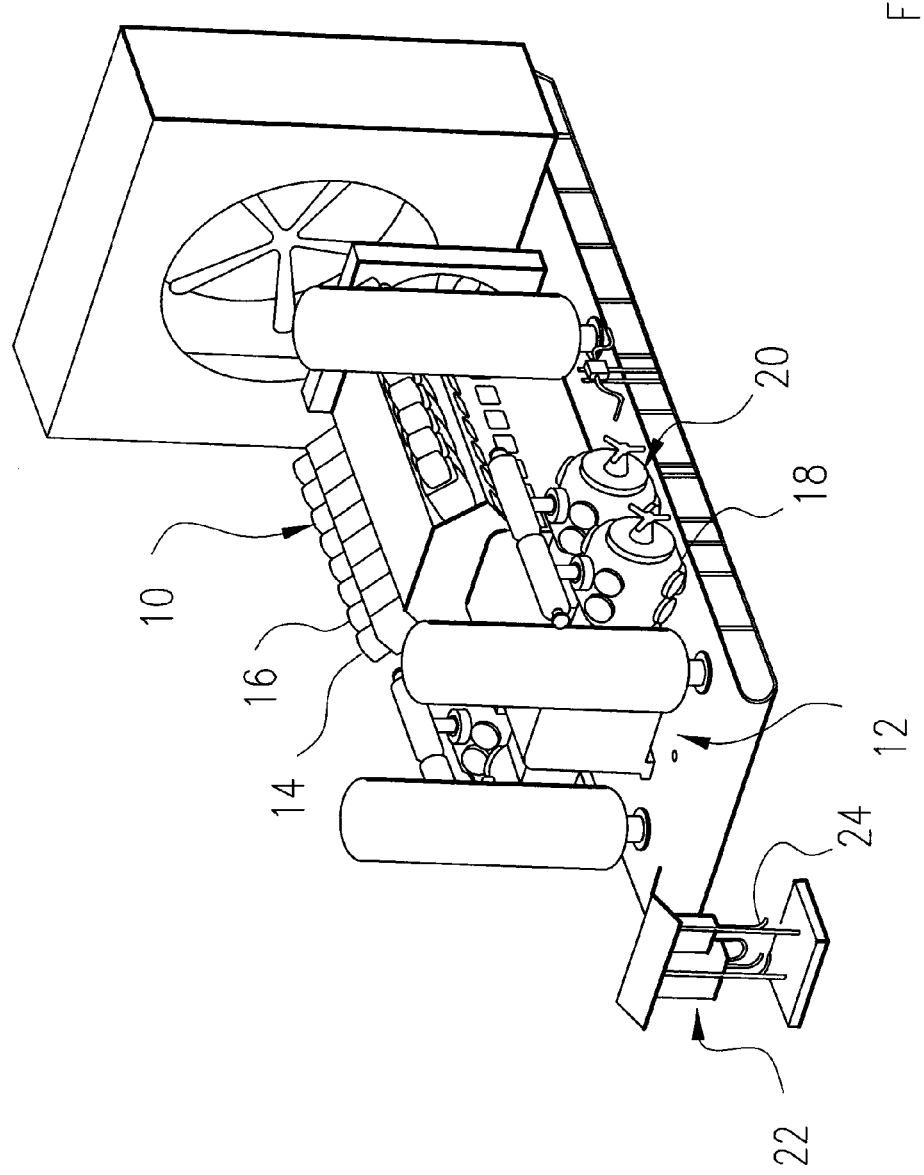
FIG. 1 diagrammatically illustrates the engine-compressor set on a skid.

FIG. 1 diagrammatically illustrates engine 10 driving compressor 12. Engine 10 has a plurality of cylinders, two of which are identified as cylinders 14, 16. Compressor 12 has a plurality of reciprocating piston cylinders, two of which are identified as cylinders 18, 20. A control box tower 22 has power and control and sensory lines 24 which lead to various components, sensors and control elements (not shown) on the skid beneath engine 10 and compressor 12. In addition, control tower 22 is configured to send signals and data to a remotely located, central control station (not shown in FIG. 1, but shown later in connection with FIG. 6). The remotely located, central control station could be miles from the engine-compressor skid.

Figure 2A:
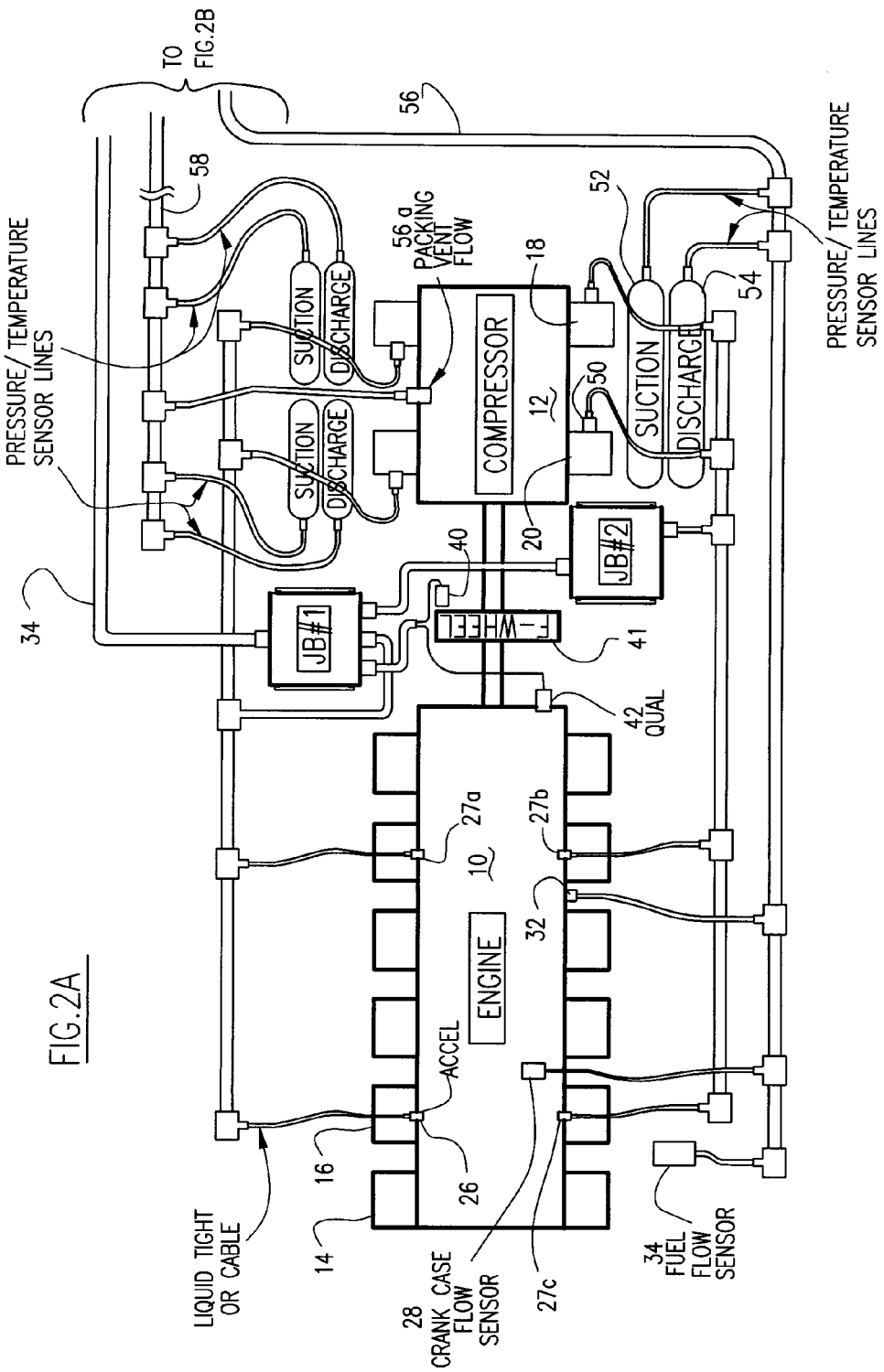
FIGS. 2A and 2B diagrammatically illustrate a block or functional diagram of the automated fault diagnosis system for the engine-compressor set and the proximate location of various sensors on the set.
Figure 2B:
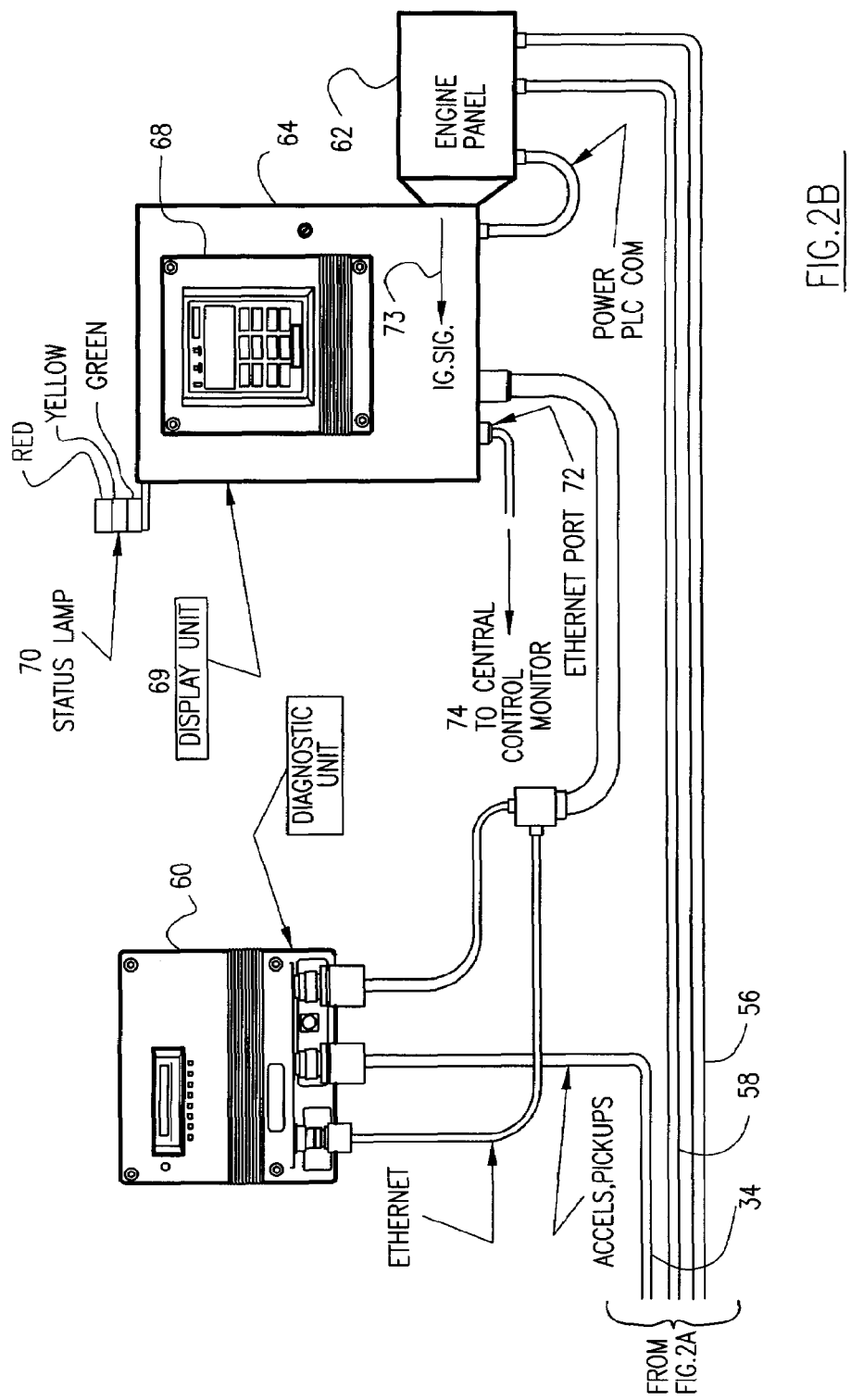

FIGS. 2A and 2B diagrammatically illustrate engine 10 driving compressor 12 as well as certain sensors and signal conditioning units for the automated fault diagnosis method and system of the present invention. Engine 10 has a plurality of cylinders, two of which are identified as cylinders 14, 16. In the illustrated embodiment of FIG. 2A, four vibration sensors 26, 27a, 27b and 27c monitor and detect vibrations from groups of cylinders on engine 10. For example, vibration sensor 26 (preferably an accelerometer) monitors vibration of the three cylinder group which includes cylinders 14, 16. Accelerometer 27a monitors vibrations of the three cylinder group adjacent thereto. A crankcase flow sensor 28 is attached to the crankcase of engine 10. Flow sensor 28 typically is a pressure sensor device monitoring the flow of combustion gases or leakage past the piston rings through the engine crankcase. Temperature sensors are mounted on each power cylinder and generate, respective cylinder exhaust, temperature signals. Engine 10 includes an exhaust manifold and temperature sensor 32 is mounted on or near the exhaust manifold to generate signals representative of engine cylinder exhaust temperatures. A fuel line (not shown) feeds fuel to engine 10 and fuel flow sensor 34 on the fuel line monitors fuel flow and develops signals representative thereof. Vibration signals from sensors 26, 27a, 27b and 27c are fed into junction boxes JB1 and JB2. The output of junction box JB2 is fed to box JB1 and the signal lines are ultimately supplied via signal conduit 34 to various automated fault diagnosis system devices shown in FIG. 2B (discussed later). The boxes JB1, JB2 may include signal conditioners, amplifiers and/or converters.

A flywheel 41 is attached to the mechanical output of engine 10 and this mechanical output also joins the mechanical input of compressor 12. A flywheel pickup 40 detects various angular positions of the flywheel 41. A qualifying signal pickup 42 (Qual) senses a cam position in the engine 10. In this particular engine, the flywheel 41 must rotate two complete cycles (720 degrees) in order for the engine 10 to complete an entire combustion cycle for all 12 cylinders. The qualifying signal from a marker on the engine cam determines when a complete engine cycle 720 degrees has occurred. The timing signals from sensor 40 and qualifying sensor 42 are also fed into junction box JB1 and ultimately through electrical conduit 34 to the diagnostic system shown in FIG. 2B.

Figure 5:
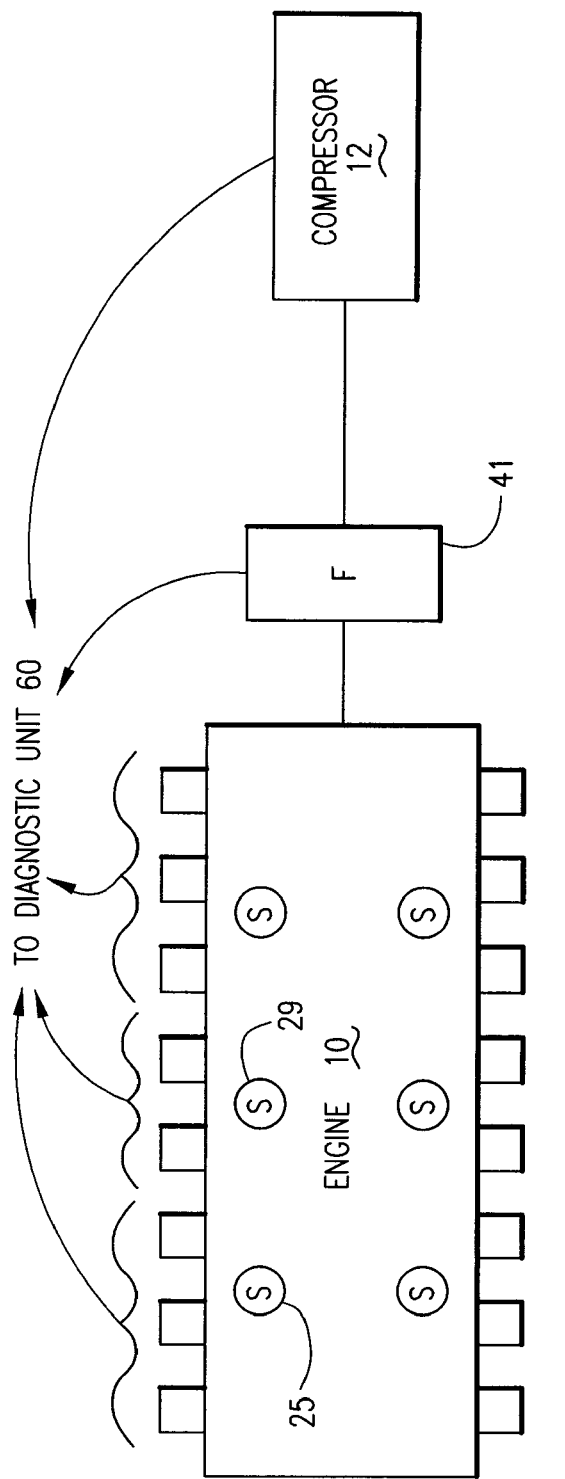
FIG. 5 diagrammatically illustrates vibration sensors near groups of engine cylinders and a general signal acquisition layout for the diagnostic unit.

FIG. 5 shows an engine 10 with 16 cylinders and six vibration sensors, one of which is identified as sensor 25. Vibration sensor 25 senses the vibrations from three cylinders in engine 10 and vibration sensor 29 senses vibrations from the two central cylinders in engine 10. These signals are supplied to the diagnostic unit. The timing signal from flywheel 41 and various signals from compressor 12 are also supplied to the diagnostic unit 60.

Compressor 12 (FIG. 2A) includes a plurality of compressor cylinders 18, 20. Each compressor cylinder has attached thereto a vibration sensor, one of which is identified as vibration sensor 50 in FIG. 2A. In addition, each stage of compressor 12 has suction and discharge temperature sensor and a suction pressure sensor and a discharge pressure sensor generating representative signals therefrom. These sensors are located in suction elements, one of which is identified as suction element 52, and discharge element, one of which is identified as discharge element 54. In addition, compressor 12 has a packing vent flow sensor 56a. Manifold suction and discharge temperatures signals, suction pressure signals, discharge temperature signals and discharge pressure signals for each compressor stage are fed via signal conduits 56, 58 to the diagnostic control system shown in FIG. 2B. In addition, signals from fuel flow sensor 34, crankcase flow sensor 28, engine exhaust temperature 32 are fed via conduit 56 to the diagnostic system. The speed of compressor 12 is obtained from pickup 40 and processed by the diagnostic system. The manifold suction pressure signals are obtained for each stage of compressor 12 and suction pressure signals and discharge pressure signals are also obtained for each stage of compressor 12. Elements 52, 54 include this data-signal acquisition aspect of the present invention.

FIG. 2B diagrammatically illustrates one embodiment of the diagnostic system. Timing signals or phase angle signals from the flywheel position detector 40 and vibration signals from vibration sensors 26, 27a and accelerometer 50 from compressor 12 are fed into a diagnostic unit 60. Slowly changing signals such as signals from fuel flow sensor 34 and crankcase flow sensor 28 and various temperature and pressure signals are supplied via signal conduits 56, 58 to engine panel 62 and auxiliary panel 64. The engine panel 62 also supplies ignition diagnostic messages. Auxiliary panel 64 includes an operator interface 68 shown in greater detail in FIG. 3. Operator interface 68 is part of display unit 69. An illuminated alarm status lamp 70 has green, yellow and red lamps indicating the current operating status of the engine-compressor set. Green is normal, yellow is warning and red is an alarm. Of course, a "warning" is simply a low significance or cautionary alarm. Slowly changing signals such as temperature and pressure and various flow signals are ultimately applied to diagnostic unit 60 via the various signal conduits shown in FIG. 2B. A high speed data communications port, such as ether net port 72, leads to a remotely disposed, central control monitor or central control station 74 discussed later in conjunction with FIG. 6.

Figure 3:
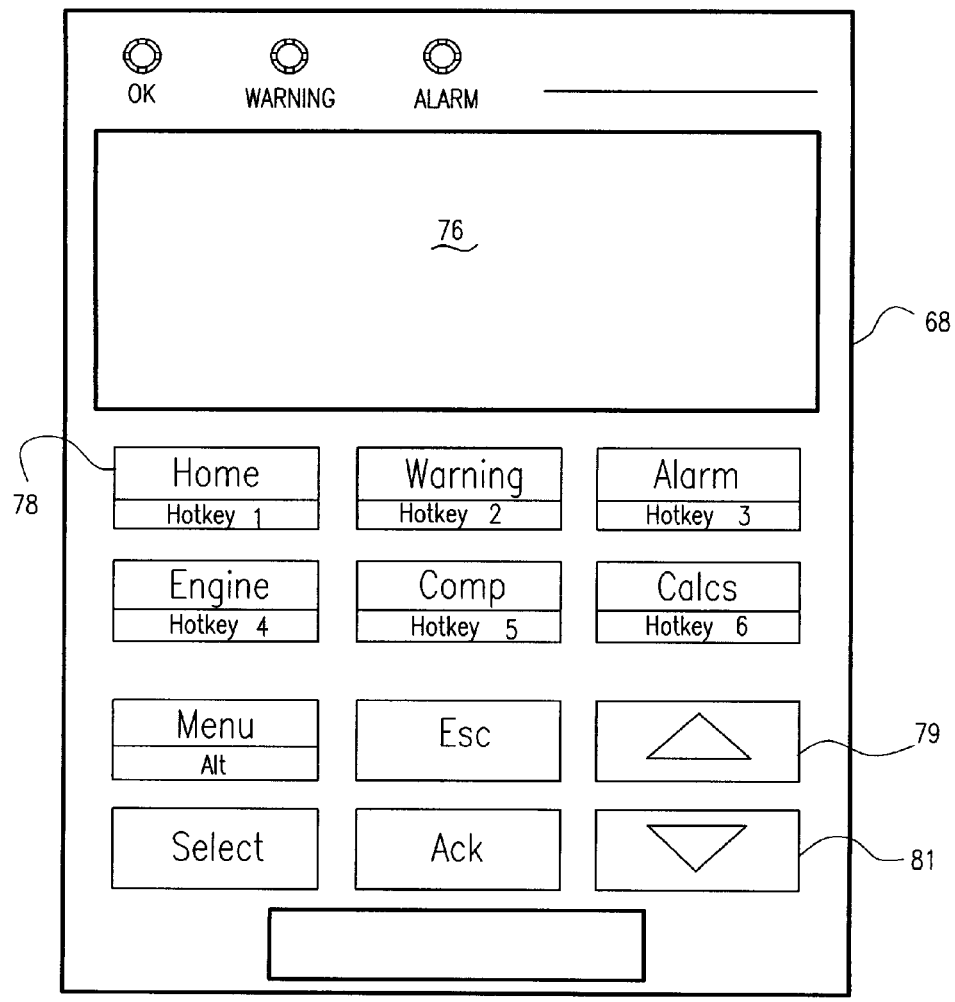
FIG. 3 diagrammatically illustrates an operator display typically mounted near the engine skid shown in FIG. 1.

FIG. 3 diagrammatically illustrates operator interface 68 which includes a display screen 76 and various operator depressable keys, one of which is identified as key 78. Up and down arrow keys 79, 81 enable the operator to page through data and signals obtained by diagnostic unit 60 in FIG. 2B. Operator key 78 may include instructional labels such as home, warning, alarm, engine, compressor (comp), calculations (calcs), menu, select, escape (esc) and acknowledge (ack). By depressing one or more of these keys on the key pad, display area 76 shows the current operating condition of the engine and the compressor, as well as the alarm thresholds and any stored alarms and chronologic data for the stored alarms from diagnostic unit 60.

As a general overview of the diagnostic system and method, the system operates during "normal" engine and "normal" compressor operations, that is, not during startup operations or shutdown operations. One important aspect of the present invention (there are several other important aspects of the invention) involves obtaining vibration signals from the engine, as well as vibration signals from the compressor, and sensing a phase angle window with a flywheel timing signal which window identifies a particular vibration associated with one of the many cylinders in the engine as well as one of the many cylinders in the compressor, such as each compressor valve. As explained earlier with respect to the engine illustrated in FIG. 2A, the shaft in the illustrated embodiment rotates 720 degrees in order to complete an entire combustion cycle for the internal combustion engine. Some engines do not require 720 degrees to complete a full engine cycle and the qualifying signal may be eliminated for the 360 degree cycle engines.

Figure 4:
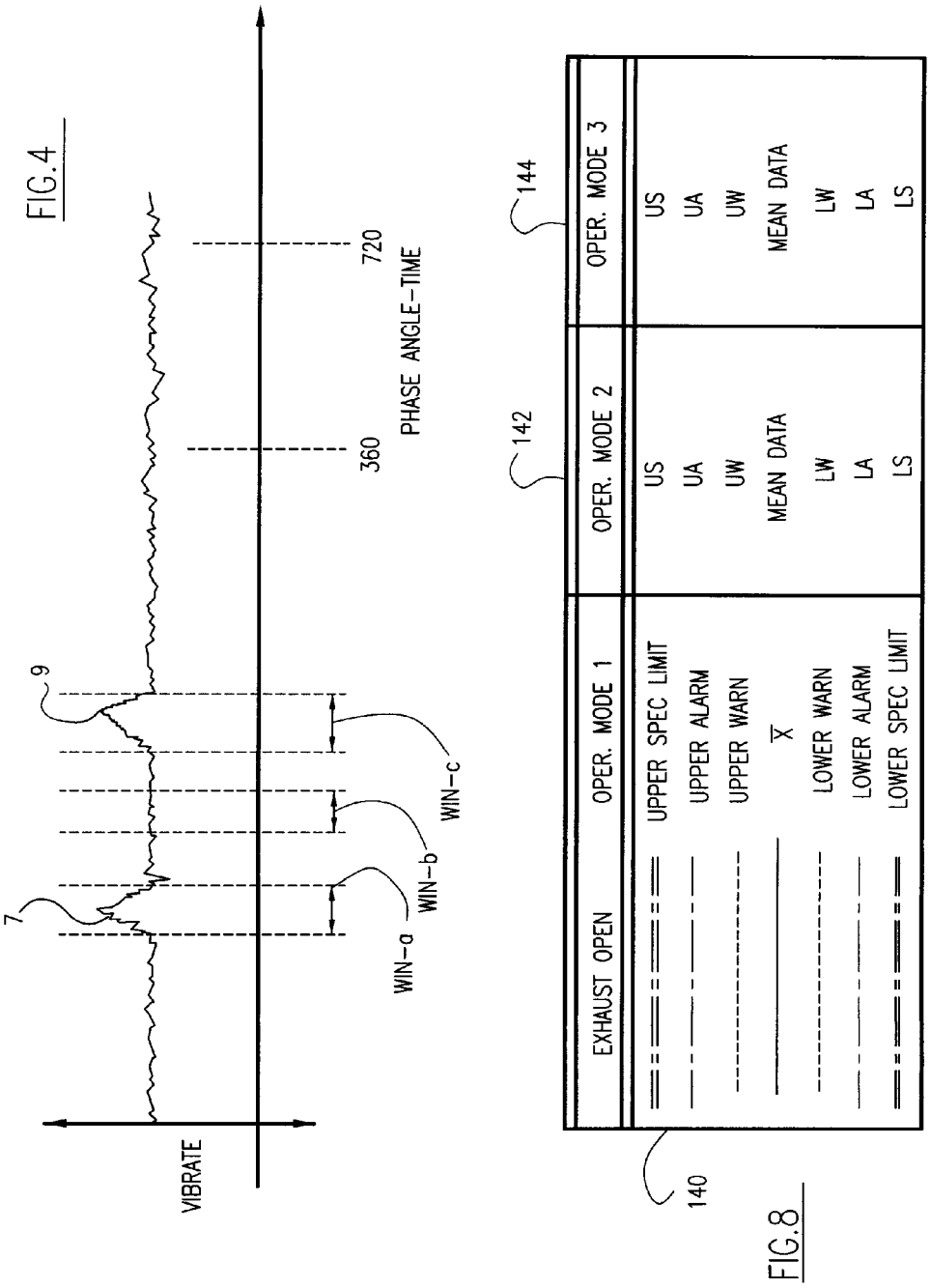
FIG. 4 diagrammatically illustrates phase angle window (timing signal) and vibration signal diagram showing three phase angle windows (and an absence of a vibration signal in one of the phase angle windows)

FIG. 4 shows the acquisition of vibration signals in various phase angle windows win-a, win-b and win-c. Window a shows vibration signal 7, window b shows no vibration signal and window c shows vibration signal 9. The diagnostic system, in general, detects statistical variations of these vibration signals, that is, the mean, maximum, minimum and energy or area under the curve, as well as any other statistical process characterizations known to persons of ordinary skill in the art. Phased marked vibration data requires a phase marker such as a once-per-turn marker or an encoder. In the diagnostic monitoring system, vibration-time (VT) patterns are recorded. Therefore, the engine condition and, more particularly, the vibration for a particular cylinder in engine 10, can be monitored by identifying the appropriate phase angle window or time boundary shown in FIG. 4. Persons of ordinary skill in the art can identify a particular vibration from a particular engine cylinder and identify the window (the beginning and the end) of the phase angle detection for that particular cylinder. Sometimes, engine manufacturers provide this data to purchasers and engineers operating the engine in the field. At other times, a skilled diagnostic technician can use a portable analyzer to sense vibration signals, look at the vibration signatures per phase angle window and determine which vibration element VT 7, 9 corresponds to which engine cylinder in engine 10. In any event, the system detects a plurality of predetermined phase angle windows about crankshaft angular positions for a corresponding plurality of predetermined reciprocating engine events per cylinder. One engine event could be the ignition of fuel in the engine cylinder under study which causes certain engine vibration signatures. Since each cylinder fires, the same event occurs for each cylinder. Since engine load conditions are classified, the system and method operates per engine event per cylinder and per engine load condition. Another engine event may be the opening or closing of an exhaust valve for the engine cylinder. The vibration signal in the phase angle window reflects that mechanical engine event per cylinder. Persons of ordinary skill in the art understand the many engine events which can be monitored by vibration sensors 26, 27a, etc. FIG. 4 shows that the absence of a signal in window b is also important in certain situations. Each phase angle window has an engine event-cylinder associated therewith. The same analysis applies to vibration signals from the compressor. These isolated signals are vibratory signatures of the event per cylinder.

Figure 6:
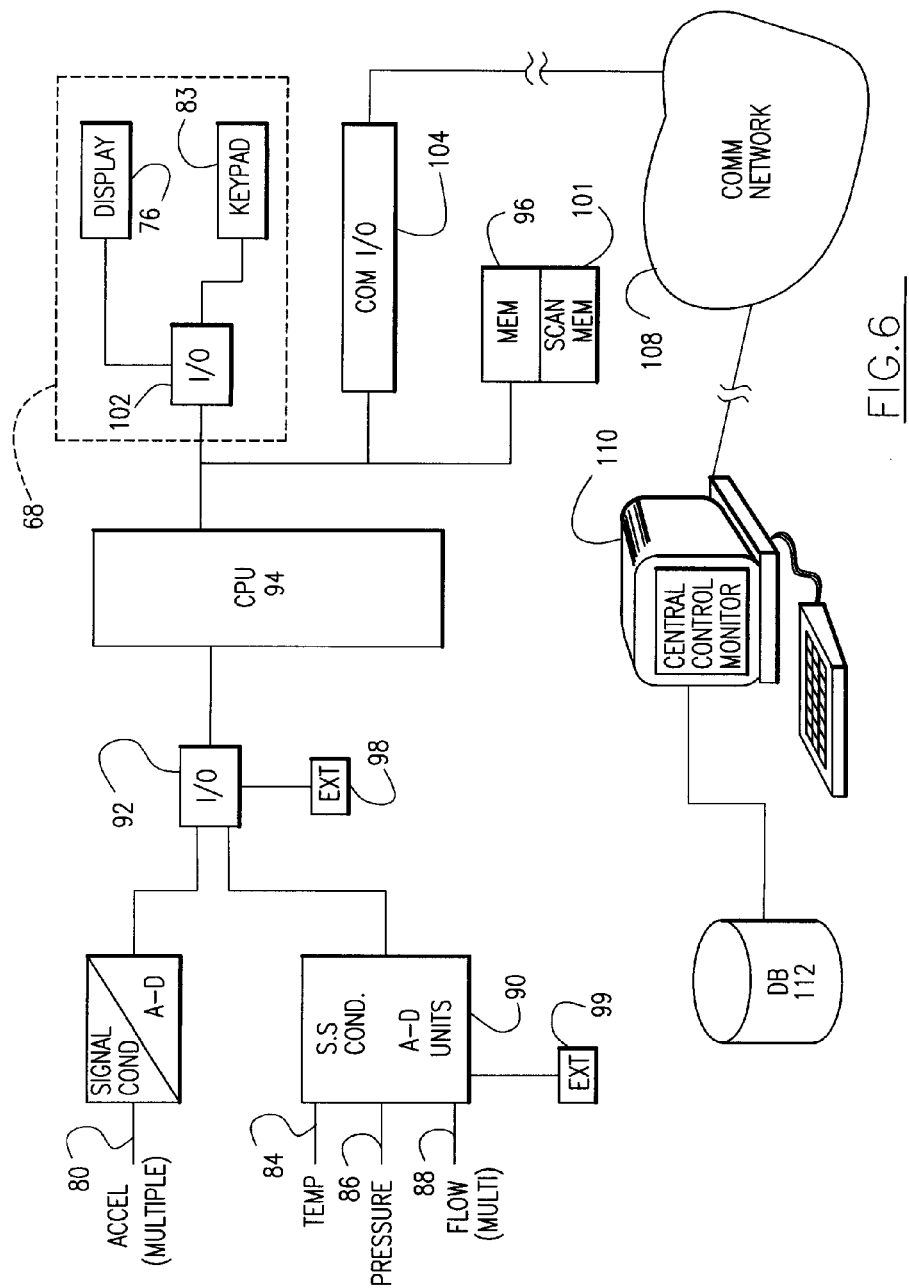
FIG. 6 diagrammatically illustrates the basic computer or functional block diagram for the automated fault diagnosis method and system.

FIG. 6 diagrammatically illustrates the computer processing system diagram for the present invention. Accelerometer or vibration representative signals (high data rate signals) are supplied via line 80 to a signal conditioning and analog-digital or A-D converter 82. A plurality of conditioners and A-D converters may be employed. Multiple temperature, pressure and flow signals 84, 86 and 88 (low data rate signals) are applied to signal conditioner A-D block element 90. The outputs from these signal conditioners and converters are applied to input/output I/O unit 92. A central processing unit or CPU 94 obtains these representative signals for vibrations (fast changing signals) and slow changing state and process signals, such as temperature, pressure and flow signals, and processes those signals using memory 96. In addition, CPU 94 may have digital signal external data port 98 and analog signal external data port 99. Scan memory 101 enables CPU 94 to obtain analog signals via external port 99 and signal conditioning unit 90 and store those analog signals (or representations thereof) into scan memory 101. CPU 94 operates in conjunction with user interface 68. Rather than microprocessor CPU 94, a programmable logic circuit or discrete logic circuits may be used. FIG. 6 shows functional aspects of the diagnostic system. Display 76 and keypad 83 are connected to CPU 94 via input/output unit 102. CPU 94 is also connected to communications input/output unit 104 which optionally connects, via data transmission line 106, to a communications network 108. A remotely located, central control monitor station 110 is also connected to communications network 108 as well as to database 112. In this manner, signals collected locally near engine-compressor system shown in FIG. 1 can be transmitted over long distances to a central control station which is remotely disposed with respect to the engine-compressor set. The communications network 101 may be any type of data communications network including Internet or private long distance communications links or wireless or satellite networks. In this manner, alarm signals are stored locally at the engine-compressor set on diagnostic unit 60 and displayed locally via operator interface 68, as well as being sent remotely to central control monitor station 110 and stored in database 112. The functions in this hardware and the functions in the software can be grouped into modules such as combustion flow alarm module and exhaust temperature alarm module.

Figure 7A:
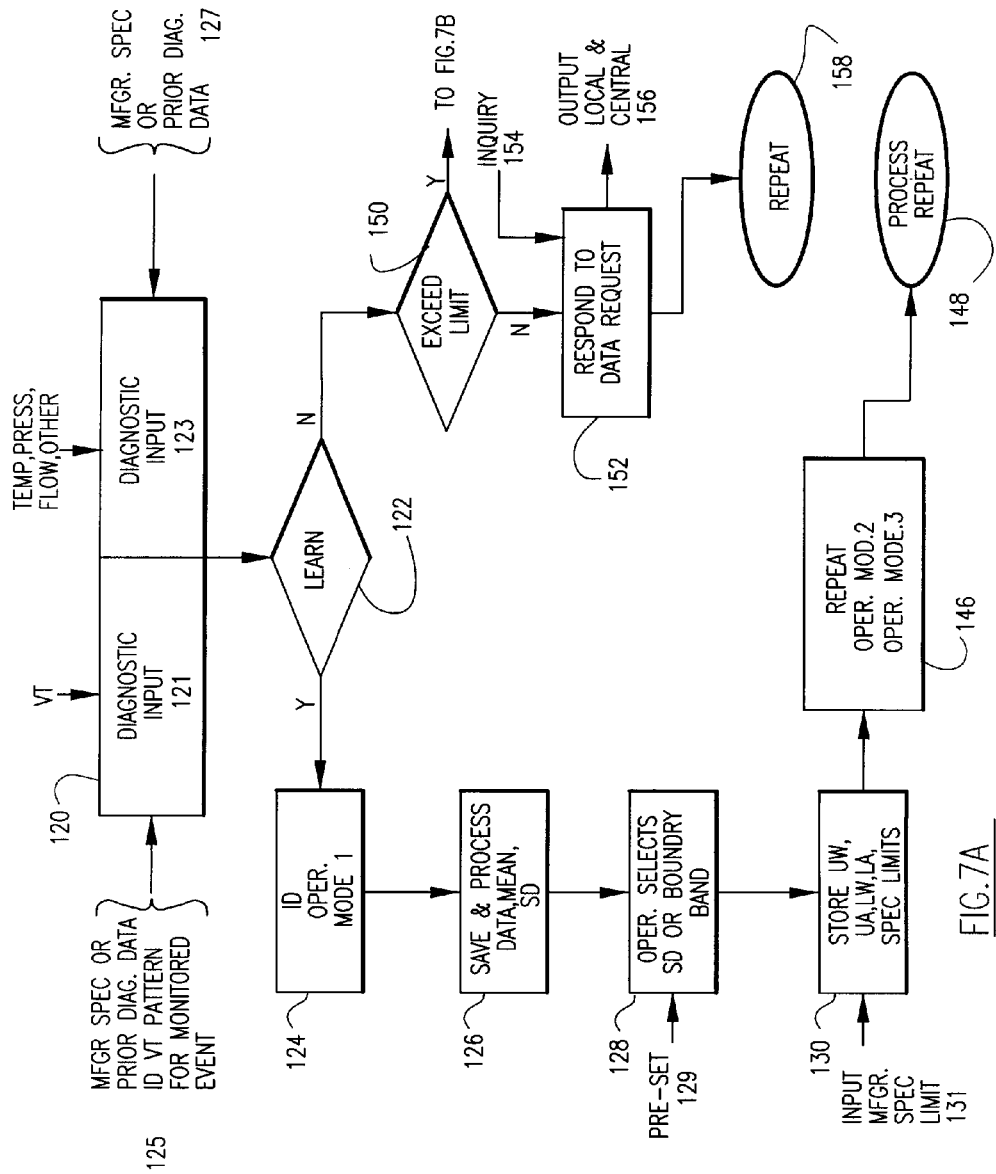
FIGS. 7A and 7B diagrammatically illustrate the basic flow chart for data acquisition and processing (the steps may be re-ordered, expanded or compressed in any convenient sequence as is known by persons of ordinary skill in the art)
Figure 7B:
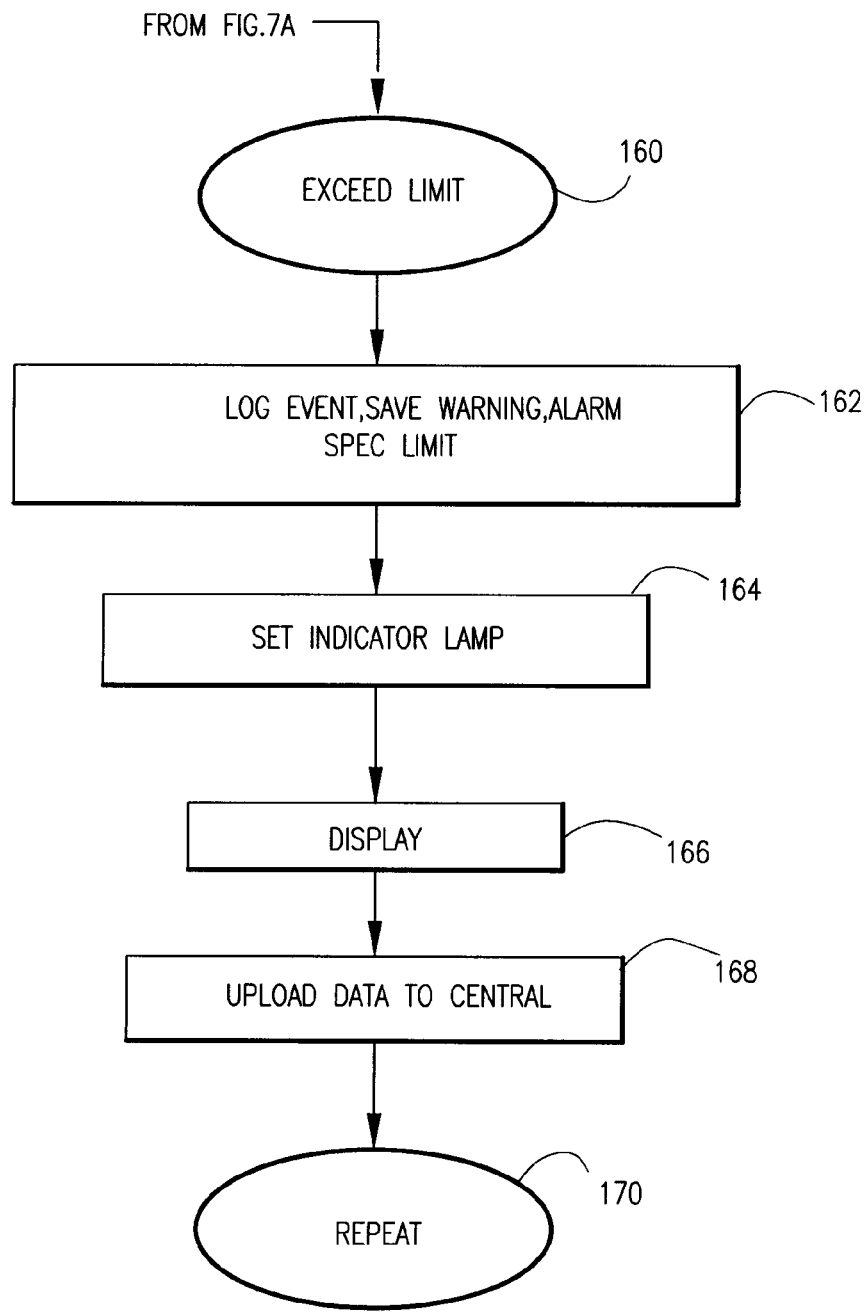

FIGS. 7A and 7B diagrammatically illustrate the general flow chart for the data processing for the automated fault diagnostic method and system. Input function 120 accepts vibration signals VT for each phase angle window, as well as slowly changing signals for temperature, pressure, flow and other signals. Input function 120 include fast data input function 121 and slow data input function 123. The operator or the manufacturer of the fault diagnosis system can input manufacturer's specifications for the engine and compressor system or the diagnosis system may accept prior diagnostic data identifying vibration—time patterns for the monitored engine event or monitored compressor event. These functions can be characterized as an isolation module which identifies vibration signatures per engine event per cylinder and per engine operating condition. The same is true regarding compressor event modules. This set-up input is shown as the input 125 on the left side of FIG. 7A. With respect to the slowly changing data signals of temperature, pressure, flow and other signals, the manufacturer's specifications or prior diagnostic data may be input as noted in element 127 on the right side of FIG. 7A.

Decision block 122 determines whether the diagnostic system is in a baseline data acquisition or "Learn" mode or whether it is in a monitoring mode. If the system is in a baseline data acquisition or learn mode (the automatic default if no baseline data is stored), the YES branch is taken and the engineer or highly skilled technician in function block 124 identifies the then current engine operating mode or the compressor operating mode for baseline data acquisition. The automated fault diagnosis method and system automatically reverts to the learn mode when there is no previously stored baseline data. For example, as explained later, normal modes (not startup or shutdown) may be less than 90% loaded mode (engine operating condition1 or compressor operating condition 1) and operating condition 2 may be a load between 90%-100% (engine operating mode 2, compressor operating mode 2) and operating condition 3 may be any load over 100% (engine operating condition 3, compressor operating condition 3). The set-up technician may designate operating modes 1, 2 and 3 with a manual input. More than three operating modes are available. In step 126, the diagnostic system saves the acquired baseline data during the learn mode, processes that data with statistical processing techniques such as locating the mean value of the signals and the maximum value and the minimum value and the standard deviation from the mean. The term "SD" refers to standard deviation. Other statistical processing algorithms may be used. The learn mode data acquisition period is generally pre-set with operator manual overrides available. In step 128, the operator or skilled technician selects a standard deviation amplifier that defines the warning and alarm limits. The limits are calculated as the mean value plus or minus the multiple of the standard deviation. See FIG. 8. Pre-set input 129 recognizes that the manufacturer may recommend preset alarm values or maximum specification values. Step 130 stores upper warning, upper alarm, lower warning, lower alarm and specification limits for these alarm signals obtained by statistical process (SP) in steps 126, 128. Signals beyond the specification limits normally indicate a sensor or system failure. Further, data input from the manufacturer for the specification limits 131 is noted in conjunction with step 130.

FIG. 8 shows a representation of a database, data structure or spreadsheet (computer memory store) for the exhaust open engine event during engine operating mode 1, engine operating mode 2 and engine operating mode 3. The mean value bar x is shown in data space 140. An upper warn uw is shown above the mean value bar x and a lower warning threshold lw is shown below mean value bar x. An upper alarm ua is shown above the upper warning threshold and an upper specification limit is shown as a deviation significantly higher than the means bar x. Operation mode 2 in data structure area 142 also includes upper warning, upper alarm and upper spec limit as well as lower warning, lower alarm and lower spec limit. Engine operation mode 3 is shown in data structure element 144. It is known to persons of ordinary skill in the art that various algorithms may be used for the statistical process analysis of these signals and automatic assignment of alarm thresholds.

Returning to FIG. 7A, the system in step 146 repeats and acquires learning or baseline data for operating mode 2 and operating mode 3. The system in step 148 repeats the process. Therefore, the system gathers information for vibration phase angle signals for the engine as well as vibration phase angle signals for the compressor. In addition, slowly changing temperature, pressure, flow and ignition diagnostic signals (see IG-SIG signal 73 in FIG. 2B) are stored in various data structures similar to that shown in FIG. 8. The present automated fault diagnosis method and system collects 172 data points.

Returning to the learn decision step 122, if the system is not in the baseline data acquisition or learn mode, the system is in a monitor mode. In a monitor mode, the system takes the NO branch from decision step 122 and determines, in decision step 150, whether any of the detected or realtime representative represented signals exceeds the limit. Of course, the vibration signals may be summed during the phase angle window or may be detected as having a maximum level or may be detected as having a minimum value or having a maximum energy or minimum energy (area under the curve). If the threshold is exceeded, whether such threshold is a warning signal or an alarm signal or whether such signal is detected as being lower than lower alarm or greater than upper alarm, step 150 takes the YES branch to FIG. 7B. If the signal is within "normal" operating ranges, the system in step 152 responds to an operator inquiry 154 and generates a locally stored output and possibly an output to remote location, that is, the central unit. Output routine 156 is noted in FIG. 7A. The system in step 158 repeats and continues to monitor the engine and the compressor.

If the YES branch is taken from exceed limit decision step 150, the system executes exceed limit routine 160 in FIG. 7B. Step 162 logs the data event (warning, alarm, or over/under spec limit, engine-compressor event, current operating mode or condition) and chronologic data (for example, date and time) and saves the data event and chronologic data in local memory stores. See FIG. 6. In step 164, the indicator lamp 70, shown in FIG. 2B, is illuminated. In step 166, the user interface 68 displays of the current warning or alarm condition. In step 168, the diagnostic system 60 uploads data to the central station. In step 170, the program repeats.

The system also includes, in an enhanced version, a feature or module that determines if a warning or alarm condition persists or exists before entering an alarm state. If a warning or an alarm has been detected, the system must, on subsequent determinations of the same condition, determine if the same warning or alarm has been logged a number of times before the warning or alarm is actually indicated. This is true when the warning or alarm condition exists during the learn mode.

Some unique aspects of the present invention include (a) continuous evaluation of engine and compressor mechanical condition and performance using a minimal set of inputs and with local alert messages; (b) alerts to indicate the nature of the observed fault and also informs the operator what to do next; (c) mechanical condition measurement using vibration referenced to the crank angle that specific engine and compressor events (events are evaluated, windows can be specified, in degrees of crankshaft angle, that allow monitor system to concentrate on specific events that periodically occur within that window); (d) measurement of normal levels of all mechanical condition and performance levels are obtained in a Learn or baseline data acquisition mode. The machine is assumed to be in normal condition when this process is underway. The monitor system characterizes the current state of the machine using statistical process control methods. The mean and standard deviation for all readings are calculated stored as the baseline; (e) recognition of engine-compressor operating conditions is determined using measured and calculated parameters such as RPM and machine load. Each operating condition is defined by a range of values for the specified operating condition variables. For example, operating condition 1 can be load less than 90% and operating condition 2 can be load between 90% and 100%. Operating condition 3 can be load over 100%. Any combination of operating condition variables can be used to define an operating condition; (f) when it is determined that there is an engine/compressor operating condition for which there is no baseline data, the automated fault diagnosis method and system automatically enters Learn mode and characterizes all parameters for that operating condition and saves a baseline. Learn mode duration is configurable by the operator; (g) when it is determined that acquired data has a corresponding baseline for a certain engine-compressor operating condition, the automated fault diagnosis method and system compares the acquired current data to the stored baseline data and generates an alert, if the current data is significantly different from the baseline; (h) since field operators have a variety of skills resulting in different levels of problem recognition and field troubleshooting, the monitor system provides more consistent and objective condition evaluation. Machinery analysts are not required to operate the monitor system since fault diagnosis is automated; (i) current protection schemes are not sophisticated and shutdowns are oftentimes reactive to process information such as lube oil pressure. Often the damage has already happened. The monitor system is proactive in that responds to operating conditions that would lead to reduced reliability. The monitor system identifies incipient failures; and (j) current monitoring systems do not optimize the operation of the machinery. The monitor system presents information that allows the machine to be operated more efficiently and reliably.

The present monitoring system is permanently installed on compressors to continuously monitor the condition of the compressor. It uses a large ensemble of transducers to monitor pressure and vibration from compressor cylinders and display the results so that an experienced analyst can perform the diagnostics.

A general discussion of product specifications and functions follow. Data is evaluated locally, on the engine-compressor skid, for alert status. Alerts are annunciated locally and remotely. The data is processed for diagnostic purposes. Diagnostic results are displayed locally and remotely. The diagnostic monitoring system can be accessed remotely to provide more extensive analysis with other tools. The diagnostic monitoring system has a built-in data scanning for reading analog data from thermocouples and voltage devices.

The diagnostic monitoring system provides monitoring and diagnostics information on the following components:
Compressor HP
Compressor Brake HP used per million standard cubic feet of gas capacity
Engine fuel consumption
Engine power cylinder heads
Compressor valve condition
Engine ignition function
Machinery The diagnostic monitoring system concept can also be applied to other types of machines that generate vibrations, pressures, temperatures and fluid flows within a range that is predictable when the machine is running.

A discussion of user characteristics follows. The user at the site will normally be a station operator. Machinery analysts may use the system as the level of diagnostic ability increases. The machinery is normally run by operators that visit the site to start it up and perform routine preventative maintenance activities. They may perform some troubleshooting functions on ignition systems, compressor valves, lubrication and other machine components but they are not trained to be machinery analysts. Operators often have a mechanical maintenance background but do not normally get involved in major machinery repairs. Complex troubleshooting may require that the machinery analyst is called to the site with an analyzer. Operators often work out of their vehicles and visit each machine several times a week. Call-outs are common for startups and troubleshooting.

Remote users are people with more skill and technical scope. The remote users may be operators or engineers who are tasked to humanly monitor many engine-compressor sets over a large geographic or system-wide territory. They require supervisory information from the machine and may need detailed information to perform troubleshooting on a particular engine-compressor set. The remote user may be an analyst.

The present automated fault diagnosis method and system is designed for use by operators who regularly visit the site. Engine-compressor diagnostics is not typically within their job function so simplicity is essential.

The typical operating environment for these engine-compressor sets is harsh. There are high levels of electro-magnetic interference or EMI from the engine ignition system on, around and near the engine-compressor set skid. The diagnostic monitoring system is designed so that circuits are protected from indirect, local lightning strikes.

The system is powered by the 24V station supply. Temperature specifications are −40C to 85C, which is industry rated. The system fits into the existing engine-compressor infrastructure—it interfaces to the existing digital control systems (DCS) using existing communication channels. Currently, the diagnostic monitoring system is not involved in engine start-up and shutdown sequencing routines.

The automated fault diagnosis method and system integrates with existing systems as follows. The diagnostic monitoring system is a panel-based system that is installed at the engine or compressor to indicate machinery condition. It can be a stand-alone system that provides only local annunciation and diagnostic information or it can be integrated into the engine-compressor set SCADA, the Supervisory Control And Data Acquisition system. SCADA is typically a computer system for gathering and analyzing real time data. SCADA systems are used to monitor and control a plant or equipment in industries such as water and waste control, energy, oil and gas refining and transportation. The automated fault diagnosis method and system uses the SCADA system to provide remote monitoring.

The automated fault diagnosis method and system may use other associated instrumentation. A separate scanner or programmable logic control sub-system (PLC) may be used to gather analog data and monitor levels for automated fault diagnosis method and system. The scanner or PLC sends digital data to the diagnostic monitoring system. Data provided from the scanner/PLC may include:

Power cylinder exhaust temperatures

Engine crank case flow

Combined compressor packing flow, 1 per compressor

Compressor stage Ps, Pd, Ts and Td

The diagnostic monitoring system can be configured to access Altronic's Enhanced CPU-95 engine ignition control for the engine-compressor set. Altronic is located in Garland, Tex. Altronic's Enhanced CPU-95 has ignition diagnostics that can be accessed using Modbus.

The user interface (FIG. 6) presents an operator with useful information summarizing machinery condition on a liquid crystal display. A built-in keyboard allows the operator to select display screens and operate the system through a menu.

In general, the output functions of the automated fault diagnosis method and system include the Red, Yellow and Green (r,y,g) light or lamp indicators for engine-compressor machine status and LED display. Machinery condition messages and diagnostic information are displayed on a small local LCD display on the panel. Important readings and results are displayed on the LCD display. Process information (temperatures, pressures) is displayed on the LCD or on a separate device such as a data scanner. There is a separate user interface 68 consisting of a 4×20 LCD text module. A numeric keypad (FIG. 3) permits user data entry and control of the operator interface.

With respect to the hardware interfaces, the diagnostic monitoring system is designed to be inserted into or mounted adjacent existing engine-compressor control panels. See tower 22, FIG. 1. Alternatively, the diagnostic monitoring system is a portion of a new engine-compressor control panel. The automated fault diagnosis method and system has network connectivity to local computer data units via ethernet connection as well as the long distance computer units via the same functions systems. See discussion above in connection with FIG. 6.

The diagnostic monitoring system 60 (FIG. 2B) looks like a PLC (programmable logic circuit or control) to the SCADA system for the engine-compressor set and can obtain data and deliver data to the SCADA like a PLC. Master Modbus functions are supported. As is known in the art, Modbus is a high-level protocol for industrial networks developed in 1979 by Modicon (now Schneider Automation Inc.). Providing services at layer 7 of the OSI model, Modbus defines a request/response message structure for a client/server environment. Modbus runs over various data links including its own Modbus+ token passing network and serial links such as RS-232 and RS-485. It is widely used with TCP/IP over Ethernet. Individual device networks connected to Modbus+ or serial links hook into Ethernet via gateways for transport over an IP network or the Internet. Modbus is governed by the Modbus-IDA Organization, a merger of the Modbus Organization and IDA Group in 2003. For more information, see www.modbus.org. The diagnostic monitoring system supports communication with some of the newer systems on the engine for diagnostic information. Ignition monitoring (line 73, FIG. 2B) is done using Altronic's Enhanced CPU-95. The diagnostic monitoring system supports Modbus data from a local data scanner or PLC showing signals representative of flow, thermocouple, RTD (temperature sensor), pressure, and vibration. Modbus data is available from the local data highway. With respect to software interfaces, the diagnostic monitoring system looks like a PLC to the data highway to allow standardized bidirectional data flow. The communications interface includes protocols for Modbus, and Dynalco Dynalink.

One important aspect (there are many other important aspects of the invention) is obtaining data to determine if all the engine cylinder heads are performing acceptably. There is a need to know if any engine cylinder head is in trouble. If the level of certainty is sufficient, the automated fault diagnosis method and system needs to determine which engine cylinder head is in trouble. Problems often encountered with engine systems include:

Valve integrity

Valve recession

Combustion leakage

The present automated fault diagnosis method and system is designed to detect and predict such engine events. The method employed by the present system uses several accelerometers mounted on the block of each bank of the engine. These vibration sensors are spaced so that each can monitor vibration from up to 3 cylinders. Phase-marked VT patterns (vibration-representative signals) are recorded. Peak and energy measurements made in specific angular windows or phase angle windows. Each window is defined around an expected engine event such as engine exhaust valve closure or engine intake valve closure. The VT measurements are compared to statistical process control (SPC) peak and energy baselines for each window. "Peak" statistical process control or "SPC" is the maximum of the signal being monitored. The "energy" of the SPC signal is the area under the curve of the VT or vibration signal keyed to the timing window. Other signal processing techniques could be used (other algorithms) rather than the maximum or peak detection and the energy of the vibration signal. Windowed comparison is necessary so that the diagnostic monitoring system can determine which events are associated to specific cylinders. Differences between the current, real time data and the SPC ranges are quantified and potential faults identified. This technique and the use of a limited number of sensors on the engine block is one of the many important aspects of the present invention. These elements include a means for timing the vibratory signals to the crankshaft angular position (and to the 720 degree machine position) and the hardware and software components can be considered to form an isolation module to identify vibration signatures unique to an engine event per cylinder. The signals form the sensors are isolated, then processed by a statistical calculator typically embodied as software.

The automated fault diagnosis method and system detects combustion leakage into the crank case from the crank case pressure with a flow measurement device as a secondary indicator of power or engine cylinder condition. The combustion flow alarm or crankcase alarm signal will not specify which cylinder is the problem.

The primary inputs into the automated fault diagnosis method and system include the phase angle designated vibration detection signals form up to 3 vibration sensors (typically accelerometers) for each engine bank. Transducers (accelerometers) are mounted on the engine block. In addition to the phase marked VT signals, the automated fault diagnosis method and system accepts the following key inputs:

Exhaust temperatures from pyrometers (if available)
Crank case flow (if available)
Crank shaft phase reference signals. In 4 stroke engines, an additional marker qualifier signal (QUAL in the Figures) is required at half the crank shaft speed.

Static or low rate data is accepted by the automated fault diagnosis method and system, that is, data that has only low frequency changes. The automated fault diagnosis method and system is also loaded with the following data: engine geometry data specifies the layout of the engine; and phase relationship between power cylinders.

Engine events have special meaning in the diagnosis of engine-compressor set operations and the engine events are configured in the automated fault diagnosis method and system for each engine power cylinder. The VT or flywheel referenced or phase referenced vibration signals are found in phase-time windows and these VT windows are bounded and specified with starting and ending angles. A partial list of events is shown here. In practice, the diagnostic monitoring system is configured for 3 or 4 engine events.

Exhaust opening
Exhaust closure
Intake opening
Intake closure
Fuel opening
Fuel closure
Combustion event
Exhaust Blow down event
Compression leak Since the diagnostic monitoring system "learns" baseline data for a number of operating conditions, Op. Modes 1, 2 and 3, the system has a data structure (which maybe classified as a database or spread sheet) conceptually as set forth in the following Data Table of Events. In the Table, "rt" refers to real time data, "St.Dev." is standard deviation characteristics. Sometimes, the alarm and warning thresholds are set at levels of standard deviations form the mean signal level. The "g,y,r" refers to green, yellow and red lamp indicators for normal, warning and alarm levels.

Data Table of Events - Table A

| | Window | Op. Mode 1 | | | | |
|---|---|---|---|---|---|---|
| | rt data | base data | St. Dev. | Alarm | Op. Mode 2 | Op. Mode 3 |
| Cylinder 1-right head | | VT | | | VT sd g,y,r | VT sd g,y,r |
| Exh. opening | St-End nn | mm | 1,2,3 | g,y,r | VT sd g,y,r | VT sd g,y,r |
| Exh. closure | St-End nn | mm | 1,2,3 | g,y,r | VT sd g,y,r | VT sd g,y,r |
| Intake open | St-End nn | mm | 1,2,3 | g,y,r | VT sd g,y,r | VT sd g,y,r |
| Intake close | St-End nn | mm | 1,2,3 | g,y,r | VT sd g,y,r | VT sd g,y,r |
| Fuel open | St-End nn | mm | 1,2,3 | g,y,r | VT sd g,y,r | VT sd g,y,r |
| Fuel close | St-End nn | mm | 1,2,3 | g,y,r | VT sd g,y,r | VT sd g,y,r |
| Comb. event | St-End nn | mm | 1,2,3 | g,y,r | VT sd g,y,r | VT sd g,y,r |
| Exh. Blow down | St-End | | | | | |
| Compr. leak | St-End | | | | | |
| Cylinder 2-right head | | | | | | |
| Exhaust opening | St-End | | | | | |
| Exhaust closure | St-End | | | | | |
| . | | | | | | |
| . | | | | | | |
| . | | | | | | |
| Cylinder 1-left head | | | | | | |
| Exhaust opening | St-End | | | | | |
| Exhaust closure | St-End | | | | | |
| . | | | | | | |
| . | | | | | | |
| . | | | | | | |

The diagnostic monitoring system can store and process 720 data points in the engine-compressor set.

With respect to outputs for the engine analysis system, an indicator of current condition is displayed on the local panel and representative data is sent to the remotely disposed, central control system. If a fault is detected in a specific cylinder, that cylinder is identified on the skid and representative fault data is typically sent to a central control system—that is, remotely sent off-site.

With respect to the Compressor Brake Horsepower or BHP, the automated fault diagnosis method and system calculates the operating parameter based on an empirical equation (known to persons of ordinary skill in the art) and compressor Ps (suction pressure), Pd (discharge pressure) and clearance (data provided by the manufacturer. If brake horsepower BHP (power delivered at or near the engine output—near the flywheel, not the rated horsepower of the engine) is being determined at the site (on the skid) from the compressor, it is normally calculated from the compressor Ps (suction pressure), Pd (discharge pressure) and clearance. The compressor manufacturer normally provides theoretical curves to calculate the compressor BHP. In the gas gathering industry, BHP is not usually known or calculated in the field because the curve is not used. Field operators rarely change the clearance and there are usually no pockets so the curve package is based on one clearance. Many times, operators don't know if the engine is over loaded or under loaded. If the operators sense trouble as a result of load (drop off of speed, improper combustion, elevated fuel manifold pressure or FMP, high exhaust temperature), they may open the suction loading valve to raise suction pressure Ps (if Ps is lower than suction line pressure). The suction loading valve and bypass valve are often used to control load and capacity.

With the actual compressor BHP calculated on site by automated fault diagnosis method and system, loading decisions are more accurate and the diagnostic monitoring system protects the engine from being overloaded. In data gathering systems, the compressor is part of a network and better compressor deployment decisions can be made if the compressor BHP is known.

The automated fault diagnosis method and system has a method for obtaining BHP and % Torque from Compressor Performance Curves. Curve coefficients are entered into the diagnostic monitoring system manually or per manufacturer's specs via the PC (personal computer) during set-up for each compressor stage or the compressor in general. The performance curve coefficients are used to determine Ev (a thermodynamic characteristic of volumetric efficiency) and BHP/MMSCFD (compressor brake horsepower per million standard cubic feet per day, a commonly used performance factor). The diagnostic monitoring system uses basic geometry data provided by the manufacturer (input during set-up) and some process information to calculate performance data.

The diagnostic monitoring system calculates thermodynamic characteristic Ev capacity and BHP/MMSCFD. After calculating BHP/MMSCFD, the diagnostic monitoring system multiplies by capacity to get compressor BHP and from that data calculates % Torque. The equations to obtain compressor brake horsepower, Ev, BHP/MMSCFD, capacity and are % Torque are known to others skilled in the art. The equations are solved for each compressor stage and totaled for the entire compressor. Sources for the performance curve coefficients include:

manufacturer's theoretical loading curves
compressor models
previously acquired diagnostic system data employed to get empirical coefficients The inputs for the compressor performance data calculations, Coefficients for Ev versus Term (a thermodynamic factor), are obtained for each compressor stage.

Coefficients for BHP/MMSCFD versus Ratio for each stage (from manufacturer's curves or previously acquired diagnostic system data). Input data that are required include:

Ps, Pd (from PLC or data scanner)
Ts, Td (suction and discharge temperature)(from PLC or data scanner)
Compressor geometry (bore, stroke, rod length, rod diameter, clearance, rated speed, mechanical efficiency, Psdrop, input from PC)
Speed (from sensor—marker)

The outputs from the automated fault diagnosis method and system for compressor performance are:

Capacity per compressor stage
BHP/MMSCFD per stage
BHP, % Torque

Compressor performance outputs are displayed on the local LCD screen and are sent to the local PLC or the central SCADA system via Modbus.

The automated fault diagnosis method and system assesses general compressor problems as follows. There are several compressor problems that can be discovered using a "first line analysis" provided by the diagnostic monitoring system. This first line analysis is a broad scope look at the compressor performance and detects differences in current performance to the expected performance of the compressor. The diagnostic monitoring system indicates that there is a problem.

The method employed by the automated fault diagnosis method and system includes a calculation of the current BHP/MMSCFD and a comparison to the BHP/MMSCFD versus Ratio curve using the performance coefficients. Excessive deviation indicates some kind of compression problem in a specific stage (valves, rings, packing). The performance curve must be calculated from performance coefficients entered during setup. Current BHP/MMSCFD is calculated from the BWR equation of state (thermodynamic factor known to persons of ordinary skill in the art). The comparison of performance measures from empirical equations and equations of state has not been done before in a commercial system installed on small compressor skids. As inputs for this compressor condition, the system uses the following:

BHP/MMSCFD versus Ratio curve from the compressor performance curves.
Current BHP/MMSCFD from BWR equation of state.
Measured Ts (temperature-suction) for each stage and Td (temperature discharge) per stage using RTDs or other types of temperature sensors.
Ps and Pd for each compressor stage
Compressor geometry (bore, stroke, rod diameter, clearance, rated speed, mechanical efficiency, Psdrop. Input from PC)
Speed (from marker or sensor)

Outputs for this compressor performance factor include an alert with an indicator of severity that there is a deviation in current and expected BHP/MMSCFD. The outputs are displayed on the local LCD screen and are sent to the local PLC and the central SCADA system via Modbus per system set-up parameters.

The automated fault diagnosis method and system detects the condition of the compressor valves. Compressor valves are wear components. As such, operators know that the compressor valves will last for a certain amount of time before the valves need repair. The problem is that the compressor (part of the engine-compressor on the skid) may be remote and a valve failure might result in an unplanned call out. As explained earlier, call outs require an operator to visit the engine-compressor site. With the diagnostic monitoring system of the present invention, the system notifies the operator before the compressor valve failure. This is the compressor valve alarm and associated module.

Using the techniques described in general compression problems section above (high value), the diagnostic monitoring system provides an indication that the performance of the compressor is deviating from expected and currently measured parameters. This feature should indicate whether or not any deviation is caused by a valve problem.

To pinpoint that a compressor valve that has failed, the diagnostic monitoring system obtains vibration data on each compression cylinder. Using one accelerometer placed in the mid section of the compressor cylinder, the diagnostic monitoring system detects if there is a valve problem. The diagnostic monitoring system generates information to identify whether the problem is related to either suction or discharge valves on a particular end (the HE or head end of the compressor cylinder or the CE or crank end of the compressor cylinder).

Using one accelerometer on each end allows the diagnostic monitoring system to pinpoint valve problems with better certainty. The relative magnitude of the vibration indicates which end was the source of the vibration. The present design of the automated fault diagnosis method and system assumes there is only one accelerometer on each cylinder.

The present automated fault diagnosis method and system uses a single accelerometer placed on each compressor cylinder and the diagnostic monitoring system collects phased VT (vibration data in a time window keyed to the phase angle of the engine-compressor set (a timing signal used to isolate the compressor specific vibration)) data relative to each accelerometer on each compressor cylinder. The diagnostic monitoring system compares the VT pattern to historical SPC (statistical process control) ranges and detect differences in amplitude (peak or maximum) and energy (area under the curve) in specific phase time windows.

Once the diagnostic monitoring system detects a problem, it is preferable that the operator have an indication identifying which compressor cylinder is at fault, that is, is near failure. As described earlier, in the "Learn" or baseline data acquisition and store mode, the SPC baselines are defined. This is one of several important aspects of the present invention.

The system, at set-up, is configured to identify angular windows in the region of specific potential faults or compressor events. This set-up is done by the installer setting the time windows and selecting manufacturer specified time windows.

The system calculates the peak and energy under the current vibration pattern in each window for the compressor event and compares the current, real time data to the SPC baseline data in the same window. Differences between the current data and the baseline SPC ranges are quantified and potential faults identified. Since the VT signature for the compressor cylinder is linked to a certain vibration sensor, identification of a problematic compressor valve is automatic. Ths is the compressor valve event alarm and module.

The automated fault diagnosis method and system detects valve condition from vibration inputs such as:
VT on the compressor head end HE and crank end CE.
SPC data derived in training mode
Event Windows Data Table of Compressor Events - Table B

| | Window | Op. Mode 1 | | | | | |
|---|---|---|---|---|---|---|---|
| | rt data | stored base data | VT-sd | Alarm | Op. Mode 2 | Op. Mode 3 |
| Comp. Cylinder 1-right head | | VT | | | VT sd g,y,r | VT sd g,y,r |
| CE | St-End nn | mm | 1,2,3 | g,y,r | VT sd g,y,r | VT sd g,y,r |
| HE | St-End nn | mm | 1,2,3 | g,y,r | VT sd g,y,r | VT sd g,y,r |
| Comp. Cylinder 2-right head | | | | | | |
| CE | St-End nn | mm | 1,2,3 | g,y,r | VT sd g,y,r | VT sd g,y,r |
| HE | St-End nn | mm | 1,2,3 | g,y,r | VT sd g,y,r | VT sd g,y,r |

The automated fault diagnosis method and system detects compressor valve condition from vibration outputs. An alert status indicates if there is a valve problem. The Learn mode process of acquiring the baseline SPC data and the technique for comparing the current data to the SPC baseline is one of several important aspects of the present invention.

The automated fault diagnosis method and system also provides fault diagnosis of spark plug and ignition diagnostics applied to the plugs in each cylinder in the engine. Ignition performance can be characterized to some extent by the voltage level required to bridge the spark plug gap and by the time that ionization occurs. Abnormally high voltage indicates excess plug gap or increased gap resistance due to air/fuel ratio, and deposits and wear on the plug. The average deviation (steadiness) of the voltage level on each plug indicates plug deterioration. The Altronic CPU-95 control and monitoring engine system is installed on many engines. This ignition system has a built-in diagnostics unit and can be configured to send diagnostic messages, other instrumentation, such as the automated fault diagnosis system.

The diagnostic monitoring system (see ig. sig. 73, FIG. 2B sent to diagnostic unit 60) reads the ignition diagnostic messages from the Altronic CPU-95. The output of the diagnostic unit 60 is a status of the ignition event on each cylinder. This is the ignition alarm module.

The automated fault diagnosis method and system additionally provides fuel consumption calculations. In the past, fuel consumption measurement was not seen as valuable for high speed equipment. However in the current competitive and regulatory environment, the measure of fuel becomes more important. This feature of the automated fault diagnosis method and system measures fuel consumption and calculates energy usage indicators with the following:
Fuel HP (horsepower)(FHP)
Energy Conversion Rate (ECR)
Brake Specific Fuel Consumption (BSFC)
cost of deviation from the manufacturer's stated BSFC comparison of engine and compressor torque levels (Torque Compare)

Examples of economic data are fuel cost per day to run the engine, both expected fuel cots and actual fuel costs.

The diagnostic monitoring system measures fuel consumption rate using a fuel flow meter 34 (FIG. 2A) and calculates BSFC (BTU/BHP-hr). This is a measure of the efficiency of the engine. The BTU/hr is derived from the fuel flow rate with well known mathematical algorithms (formulas) and the BHP (brake horsepower) is derived from the compressor. "Torque Compare" is the difference between measured or calculated load from the compressor and the Fuel HP (FHP) result. The difference between Fuel HP and Compressor BHP should not be greater than 5%. This 5% is the limit alarm pre-set at installation. Compressor BHP is measured or calculated from the compressor empirical compressor performance or estimated from manufacturer's specifications. The inputs into the fuel consumption rate module are:

Fuel BTU/ft^3. (fixed since real time gas composition data is not available)
Fuel flow rate
Cost of fuel
Compressor BHP The outputs from the automated fault diagnosis method and system for the fuel consumption rate module are:

Fuel BHP
Energy Conversion Rate (ECR)
Brake Specific Fuel Consumption (BSFC)
Cost of deviation from the manufacturer's stated BSFC
Comparison of engine and compressor torque levels (Torque Compare).

The automated fault diagnosis method and system measures crank case flow rate since this operating parameter for the engine is a good indicator of power cylinder ring leakage. The method and the system involves installation of an inexpensive flow measurement device in the crank case vent line and measure flow rate. If the flow rate increases above an alarm limit, generate an alert. Consistency is more important than accuracy. Data input into the automated fault diagnosis method and system for this module is the flow rate measurement. The output is an indication if the flow rate is acceptable.

The automated fault diagnosis method and system monitors packing vent flow on the compressor. When compressor rod packing leaks, gas is wasted and falls into a bucket (a discharge designation) called fugitive emissions. Repairing the compressor packing early reduces the amount of gas that is lost. To achieve this diagnostic element, the operator ties all the packing vent lines together and measures combined flow. Consistency is more important than accuracy. The automated fault diagnosis method and system accepts, as an input to this module, flow rate measurement from sensor, scanner or PLC. The output is an indication that the flow rate is acceptable.

The automated fault diagnosis method and system also measures combustion quality of the engine in the engine-compressor set. Combustion quality evaluates the pressures and forces developed in power cylinders. Peak pressure statistics (average, standard deviation, maximum and minimum) are most often used. Exhaust temperatures and power head temperatures are fairly good indicators of combustion quality. An engine with poor combustion quality is stressed mechanically and thermally, has poor emissions, poor fuel consumption, increased wear and increased maintenance costs. The purpose of the combustion quality module is to warn the operator if the engine combustion quality is deteriorating. The automated fault diagnosis method and system generates alerts under the following conditions:

the spread of the exhaust or power cylinder head temperatures increases detonation or misfiring is detected in any of the engine cylinders (module attempts to indicate which cylinder is involved)

the speed is unsteady

The automated fault diagnosis method and system, with respect to the combustion quality—temperature method, measures engine exhaust (or head) temperatures. The module establishes a normal spread (max-min) for these engine exhaust (or head) temperatures. An alert is issued when the spread is too high. A high temperature spread might be caused by high, low or both high and low temperatures. The alert indicates which cylinders are outside normal operating range. This module accepts as inputs the cylinder exhaust (or head) temperatures from a sensor or scanner or PLC. The module has, as an output, an alert that the temperature of a specific cylinder is in alarm.

The claims appended hereto are meant to cover modifications and changes within the scope of the present invention.

What is claimed is:

The invention claimed is:

1. An automated fault diagnosis method for a reciprocating, multiple cylinder engine driving a reciprocating, multiple cylinder compressor, said multiple cylinder engine having sub-pluralities of cylinders, an engine crankcase, a crankshaft and an engine cylinder exhaust, comprising:

on each of said sub-plurality of engine cylinders, sensing vibratory signals from a single location;

isolating pluralities of vibration signatures from each group of vibratory signals, each vibration signature correlated to an engine cylinder and further to a respective predetermined engine event of a corresponding plurality of predetermined engine events per engine cylinder, the isolation based upon concurrently obtained timing signals correlated to crankshaft angular positions for a corresponding one of said plurality of predetermined engine events and each said engine cylinder and;

establishing a plurality of engine load operating conditions other than start-up and shut-down operating conditions;

in a baseline data acquisition mode, calculating statistical characteristics for respective vibration signatures for each predetermined engine event per engine cylinder per each engine load condition and assigning engine event alarm thresholds for each engine event, engine cylinder and engine load condition;

sensing combustion gas flow through said crankcase and generating a representative crankcase flow signal;

in said baseline data acquisition mode, calculating statistical characteristics for respective crankcase flow signals for each engine load condition and assigning combustion gas alarm thresholds for each engine load condition;

sensing engine cylinder exhaust temperatures and generating representative signals therefor;

in said baseline data acquisition mode, calculating statistical characteristics for respective engine exhaust temperature signals and assigning engine exhaust temperature alarm thresholds for each engine load condition;

in a monitoring mode, matching a current engine load operating condition with one of said plurality of engine load conditions and concurrently monitoring respective vibration signatures, respective crankcase flow signals and respective engine exhaust temperature signals, and:

issuing a unique engine event alarm identified with the corresponding engine cylinder when said respective vibration signature exceeds said engine event alarm thresholds per predetermined engine event per engine cylinder and per each engine load condition;

issuing a combustion flow alarm when said respective crankcase gas flow signals exceeds said combustion gas flow alarm threshold; and, issuing a engine exhaust temperature alarm when said respective engine exhaust temperature signals for the matching operating condition exceed said engine exhaust temperature alarm thresholds.

2. An automated fault diagnosis method as claimed in claim 1 including determining the presence or absence of statistical characteristics for respective vibration signatures per predetermined engine event per engine cylinder and per each engine load condition, and for respective crankcase flow signals per each engine load condition and for respective engine exhaust temperature signals per each engine load condition, and, in the absence thereof, automatically entering the corresponding baseline data acquisition mode.

3. An automated fault diagnosis method as claimed in claim 2 in the monitoring mode and in the event of issuance of the alarm, logging chronologic data therefor corresponding to said engine event and current engine load condition.

4. An automated fault diagnosis method as claimed in claim 3 wherein said multiple cylinder compressor includes compressor valves having compressor valve events and the automated fault diagnosis method includes:

on each compressor cylinder, sensing compressor vibratory signals thereon;

isolating plurality of compressor vibratory signals correlated to each compressor cylinder and further to a respective predetermined compressor valve event of a corresponding plurality of predetermined compressor valve events per compressor cylinder, the isolation based upon concurrently obtained timing signals correlated to crankshaft angular positions for a corresponding one of said plurality of predetermined compressor valve events and each said compressor cylinder and;

establishing a plurality of compressor load operating conditions other than start-up and shut-down operating conditions;

in said baseline data acquisition mode, calculating statistical characteristics for respective compressor vibration signatures for each predetermined compressor event per compressor cylinder per each compressor load condition and assigning compressor valve alarm thresholds for each compressor event, compressor cylinder and compressor load condition;

in said monitoring mode, matching a current compressor load operating condition with one of said plurality of compressor load conditions and concurrently monitoring respective compressor vibration signatures, and:

issuing a unique compressor valve event alarm identified with the corresponding compressor cylinder when said respective compressor vibration signature exceeds said compressor valve event alarm thresholds per predetermined compressor event per compressor cylinder and per each compressor load condition.

5. An automated fault diagnosis method for a reciprocating, multiple cylinder engine driving a reciprocating, multiple cylinder compressor, said reciprocating, multiple cylinder engine having sub-pluralities of designated cylinders therein, comprising:

providing a plurality of vibration sensors wherein a single vibration sensor detects vibration for each sub-plurality of engine cylinders;

generating respective vibration signals from each vibration sensor of said plurality of vibration sensors;

detecting a plurality of predetermined phase angle windows about crankshaft angular positions for a corresponding plurality of predetermined reciprocating engine events;

in a baseline data acquisition mode, storing respective vibration signals for each phase angle window corresponding to said plurality of predetermined engine events for a plurality of engine load operating conditions other than start-up and shut-down operating conditions;

in said baseline data acquisition mode, calculating statistical characteristics for respective vibration signals per phase angle window corresponding to said predetermined engine events for each operating condition of said plurality of operating conditions;

assigning alarm thresholds for said respective vibration signals per phase angle windows corresponding to said predetermined engine events for each operating condition based upon the corresponding statistical characteristics therefor; and, in a monitoring mode, acquiring respective vibration signals for said corresponding phase angle window and matching a current operating condition of said engine with one of said plurality of operating conditions; and, in said monitoring mode, issuing an alarm unique to one of said plurality of predetermined engine events when said respective vibration signal corresponding to said engine event for the matching operating condition exceeds said alarm threshold.

6. An automated fault diagnosis method as claimed in claim 5 wherein the detecting for said plurality of predetermined phase angle windows generates a timing signal for said predetermined engine events.

7. An automated fault diagnosis method as claimed in claim 5 wherein assigning alarm thresholds for predetermined engine events for each operating condition includes manual and automatic assignment of said alarm thresholds.

8. An automated fault diagnosis method as claimed in claim 5 including transmitting the unique alarm to a remote location away from said engine.

9. An automated fault diagnosis method as claimed in claim 5 including storing the unique alarm and logging chronologic data therefor corresponding to said engine event and current operating condition of said engine.

10. An automated fault diagnosis method as claimed in claim 9 including displaying, upon operator command, said unique alarm and logged chronologic data therefor corresponding to said engine event and logged operating condition of said engine.

11. An automated fault diagnosis method as claimed in claim 10 including issuing an illuminated alarm near said engine upon issuance of the unique alarm.

12. An automated fault diagnosis method as claimed in claim 5 including generating a local alarm alert, near said engine, and transmitting the unique alarm to a remote location away from said engine.

13. An automated fault diagnosis method as claimed in claim 5 wherein said reciprocating, multiple cylinder engine includes a crankcase and the automated fault diagnosis method includes providing a crankcase gas flow measurement device mounted on said engine crankcase, said flow measurement device generating a crankcase flow representative signal;

in said baseline data acquisition mode, monitoring said crankcase flow signal during each operating condition of said plurality of operating conditions and calculating statistical characteristics for respective crankcase flow signals corresponding to each operating condition;

assigning combustion flow alarm thresholds for said respective crankcase flow signals for each operating condition based upon the corresponding statistical characteristics therefor; and, in a monitoring mode, acquiring respective crankcase flow signals and matching a current operating condition of said engine with one of said plurality of operating conditions; and, in said monitoring mode, issuing a combustion flow alarm when said respective crankcase flow signals for the matching operating condition exceeds said combustion flow alarm threshold.

14. An automated fault diagnosis method as claimed in claim 5 wherein said reciprocating, multiple cylinder engine includes an exhaust manifold and the automated fault diagnosis method includes providing an engine exhaust temperature sensor mounted on or adjacent said engine exhaust manifold to sense cylinder exhaust temperature, the engine exhaust temperature sensor generating a representative engine exhaust temperature signal;

in said baseline data acquisition mode, monitoring said engine exhaust temperature signal during each operating condition of said plurality of operating conditions and calculating statistical characteristics for respective engine exhaust temperature signals corresponding to each operating condition;

assigning engine exhaust temperature alarm thresholds for said respective engine exhaust temperature signals for each operating condition based upon the corresponding statistical characteristics therefor; and, in a monitoring mode, acquiring respective engine exhaust temperature signals and matching a current operating condition of said engine with one of said plurality of operating conditions; and, in said monitoring mode, issuing a engine exhaust temperature alarm when said respective engine exhaust temperature signals for the matching operating condition exceed said engine exhaust temperature alarm thresholds.

15. An automated fault diagnosis method as claimed in claim 5 wherein said reciprocating, multiple cylinder compressor includes a suction manifold and a discharge manifold; and the automated fault diagnosis method includes:

providing a plurality of suction and discharge temperature sensors mounted on said suction manifold for each compressor stage, a respective suction and discharge temperature sensor sensing the corresponding temperature for a respective compressor stage, each manifold suction and discharge temperature sensor generating a representative manifold suction and discharge temperature signal;

providing a plurality of suction pressure sensors and discharge pressure sensors respectively mounted on said suction manifold and said discharge manifold for each compressor stage, each suction pressure sensor and discharge pressure sensor sensing the corresponding suction pressure and discharge pressure for a respective compressor stage and generating a representative suction pressure and discharge pressure signals therefor;

sensing the speed of said compressor and generating a speed signal;

in said baseline data acquisition mode, monitoring:
manifold suction and discharge temperature signals for each stage,
suction pressure signals for each stage,
discharge pressure signals for each stage, and
speed signals;

calculating and storing baseline data for a plurality of operating compressor conditions other than start-up and shut-down operating conditions with respect to:
capacity per stage,
brake horsepower,
brake horsepower per unit volume throughput period per stage, and
total capacity and total brake horsepower per unit volume throughput period for said compressor, based upon predetermined mathematical algorithms and compressor manufacturer's loading curves, compressor models and preexisting data relative to said compressor and said manifold suction and discharge temperature signals for each stage,
suction pressure signals for each stage,
discharge pressure signals for each stage, and
speed signals; and,
logging chronologic data therefor corresponding to said each compressor operating condition of said plurality of operating conditions for said compressor.

16. An automated fault diagnosis method as claimed in claim 15 including calculating statistical characteristics for compressor performance based upon said total brake horsepower per unit volume throughput period for each operating compressor condition of said plurality of operating conditions for said compressor;

assigning compressor performance alarm thresholds for compressor performance for each operating condition based upon the corresponding statistical characteristics therefor; and, in a monitoring mode, acquiring:
said manifold suction and discharge temperature signals for each stage,
suction pressure signals for each stage,
discharge pressure signals for each stage, and
speed signals, and, matching a current operating compressor condition of said compressor with one of said plurality of operating conditions; and, in said monitoring mode, issuing a compressor performance alarm when said respective compressor performance for the matching operating compressor condition exceed said compressor performance alarm thresholds.

17. An automated fault diagnosis method as claimed in claim 15 wherein said reciprocating, multiple cylinder engine is supplied with fuel and said engine has a predetermined fuel consumption rate and data providing representative of cost of said fuel, and the automated fault diagnosis method includes:

providing a fuel flow sensor for said fuel supplied to said engine and generating fuel flow signals representative thereof, calculating, storing and, upon operator input, displaying brake horsepower fuel consumption based upon a predetermined correlation between the total compressor brake horsepower and the fuel flow rate from said fuel flow signals.

18. An automated fault diagnosis method as claimed in claim 15 wherein said reciprocating, multiple cylinder compressor includes compressor valves having compressor valve events and the automated fault diagnosis method includes:

providing a plurality of vibration sensors for said compressor, a single vibration sensor mounted on a respective compressor cylinder of said reciprocating, multiple cylinder compressor for detection of compressor cylinder vibration;

generating respective compressor vibration signals from each vibration sensor mounted on the respective compressor cylinder;

detecting a second plurality of predetermined phase angle windows about crankshaft angular positions for a corresponding plurality of predetermined compressor valve events;

in a baseline data acquisition mode, storing respective compressor vibration signals for each phase angle window corresponding to said plurality of predetermined compressor valve events for said plurality of operating compressor conditions other than start-up and shut-down operating conditions;

in said baseline data acquisition mode, calculating statistical characteristics for respective compressor vibration signals per phase angle window corresponding to said predetermined compressor valve events for each operating compressor condition of said plurality of operating conditions;

assigning compressor valve alarm thresholds for said respective compressor vibration signals per phase angle windows corresponding to said predetermined compressor valve events for each operating compressor condition based upon the corresponding statistical characteristics therefor; and, in a monitoring mode, acquiring respective compressor vibration signals for said corresponding phase angle window and matching a current operating compressor condition with one of said plurality of operating compressor conditions; and, in said monitoring mode, issuing a compressor valve alarm unique to one of said plurality of predetermined compressor events when said respective compressor vibration signal corresponding to said compressor event for the matching operating compressor condition exceeds said compressor valve alarm threshold.

19. An automated fault diagnosis method as claimed in claim 5 wherein said reciprocating, multiple cylinder engine includes an ignition system controlling a spark plug firing for each cylinder in said engine and outputting a signal representative of ignition diagnostics, and the automated fault diagnosis method includes:

in a baseline data acquisition mode, storing respective ignition diagnostics signals for each engine cylinder for said plurality of engine operating conditions other than start-up and shut-down operating conditions;

in said baseline data acquisition mode, calculating statistical characteristics for respective ignition diagnostics signals for each engine operating condition of said plurality of engine operating conditions;

assigning ignition diagnostics alarm thresholds for said respective ignition diagnostics signals for each operating condition based upon the corresponding statistical characteristics therefor; and, in a monitoring mode, acquiring respective ignition diagnostics signals for each engine cylinder and matching a current engine operating condition with one of said plurality of engine operating conditions; and, in said monitoring mode, issuing an ignition diagnostics alarm when said respective ignition diagnostics signal corresponding to said matching engine operating condition exceeds said ignition diagnostics alarm threshold.

20. An automated fault diagnosis system for a reciprocating, multiple cylinder engine driving a reciprocating, multiple cylinder compressor, said multiple cylinder engine having sub-pluralities of cylinders, an engine crankcase, a crankshaft and an engine exhaust manifold, comprising:

a plurality of vibration sensors each generating respective vibratory signals for each engine cylinder group;

a phase angle sensory system for detecting a plurality of predetermined phase angle windows about crankshaft angular positions for a corresponding plurality of predetermined reciprocating engine events;

means for generating timing signals correlated to crankshaft angular positions for a corresponding one of said plurality of predetermined engine events and each said engine cylinder;

an isolation module, coupled to said plurality of vibration sensors and said means for timing, isolating pluralities of vibration signatures from each group of vibratory signals, each vibration signature correlated to an engine cylinder and further to a respective predetermined engine event of a corresponding plurality of predetermined engine events per engine cylinder;

a computerized diagnostic system, coupled to said isolation module, with a processor, memory stores, a display and an operator interface, said computerized diagnostic system having a baseline data acquisition operational mode and a monitoring operational mode both effective for a plurality of engine load operating conditions other than start-up and shut-down engine operating conditions;

a statistical characteristic calculator, as part of said computerized diagnostic system and in said baseline data acquisition mode, first storing respective vibration signatures for each predetermined engine event per engine cylinder per engine load operating condition, calculating statistical characteristics for respective vibration signature per predetermined engine event per engine cylinder and per engine load condition, and assigning engine event alarm thresholds for each engine event, engine cylinder and engine load condition;

crankcase gas flow sensor sensing combustion gas flow through said crankcase and generating a representative crankcase flow signal;

said statistical characteristic calculator having a combustion gas flow module calculating statistical characteristics for respective crankcase flow signals for each engine load condition and assigning combustion alarm thresholds for each engine load condition;

engine exhaust temperature sensor generating representative engine cylinder exhaust temperature signals;

said statistical characteristic calculator having an engine exhaust temperature module calculating statistical characteristics for respective engine exhaust temperature signals and assigning engine exhaust temperature alarm thresholds for each engine load condition;

a monitor determining a current engine load operating condition with one of said plurality of engine load conditions, said monitor coupled to said isolation module and receiving current pluralities of vibration signatures, said crankcase flow sensor and receiving current crankcase flow signals, and said engine exhaust temperature sensor and receiving current engine exhaust temperature signals;

an engine event alarm module issuing a unique engine event alarm identified with the corresponding engine cylinder when said respective vibration signature exceeds said engine event alarm thresholds per predetermined engine event per engine cylinder and per each engine load condition;

a combustion gas alarm module issuing a combustion gas alarm when said respective crankcase flow signals exceeds said combustion gas alarm threshold; and, a engine exhaust temperature alarm module issuing a engine exhaust temperature alarm when said respective engine exhaust temperature signals for the matching operating condition exceed said engine exhaust temperature alarm thresholds.

21. An automated fault diagnosis system as claimed in claim 20 including automatic means for entering the corresponding baseline data acquisition mode in the absence of statistical characteristics for respective vibration signatures per predetermined engine event per engine cylinder and per each engine load condition, and for respective crankcase flow signals per each engine load condition and for respective engine exhaust temperature signals per each engine load condition.

22. An automated fault diagnosis system as claimed in claim 21 including a logger for logging all alarm data with chronologic data corresponding to said engine event and current engine load condition.

23. An automated fault diagnosis system as claimed in claim 22 wherein said multiple cylinder compressor includes compressor valves having compressor valve events and the automated fault diagnosis system includes:
on each compressor cylinder, compressor vibration sensors sensing compressor vibratory signals thereon;
said isolation module including a compressor isolation module isolating the plurality of compressor vibratory signals correlated to each compressor cylinder and further to a respective predetermined compressor valve event of a corresponding plurality of predetermined compressor valve events per compressor cylinder;
said computerized diagnostic system, coupled to said compressor isolation module, and said baseline data acquisition operational mode and monitoring operational mode both effective for a plurality of compressor load operating conditions other than start-up and shut-down engine operating conditions;
said statistical characteristic calculator having a compressor valve module and in said baseline data acquisition mode, first storing respective compressor vibration signatures for each predetermined compressor event per compressor cylinder per compressor load operating condition, calculating statistical characteristics for respective compressor vibration signature per predetermined compressor event per compressor cylinder and per compressor load condition, and assigning compressor valve event alarm thresholds for each compressor event, compressor cylinder and compressor load condition;
said monitor determining a current compressor load operating condition with one of said plurality of compressor load conditions, said monitor coupled to said isolation module and receiving current pluralities of compressor vibration signatures;
a compressor valve event alarm module issuing a compressor valve event alarm identified with the corresponding compressor cylinder when said respective compressor vibration signature exceeds said compressor valve event alarm thresholds per predetermined compressor event per compressor cylinder and per each compressor load condition.

24. An automated fault diagnosis system for a reciprocating, multiple cylinder engine driving a reciprocating, multiple cylinder compressor, wherein the engine cylinders are sub-divided into groups each having a sub-plurality of cylinders therein, comprising:
a plurality of vibration sensors each generating respective vibration signals for each engine cylinder group;
a phase angle sensory system for detecting a plurality of predetermined phase angle windows about crankshaft angular positions for a corresponding plurality of predetermined reciprocating engine events;
a computerized diagnostic system, coupled to said vibration sensors and said phase angle sensory system, with a processor, memory stores, a display and an operator interface, said computerized diagnostic system having a baseline data acquisition operational mode and a monitoring operational mode both effective for a plurality of engine operating conditions other than start-up and shut-down engine operating conditions;
as part of said computerized diagnostic system, a statistical characteristic calculator first storing respective vibration signals for each phase angle window corresponding to said plurality of predetermined engine events for corresponding engine operating conditions, calculating statistical characteristics for respective vibration signals per phase angle window corresponding to said predetermined engine events for each engine operating condition, and assigning alarm thresholds for said respective vibration signals per phase angle windows corresponding to said predetermined engine events for each operating condition based upon the corresponding statistical characteristics therefor; and,
as part of said computerized diagnostic system, a monitor acquiring respective vibration signals for said corresponding phase angle window and matching a current engine operating condition with one of said plurality of engine operating conditions; and,
an alarm unit, coupled to said statistical characteristic calculator and said monitor and said memory stores, issuing an alarm unique to one of said plurality of predetermined engine events when said respective vibration signal corresponding to said engine event for the matching engine operating condition exceeds said alarm threshold and storing the unique alarm in said memory stores.

25. An automated fault diagnosis system as claimed in claim 24 wherein said alarm unit includes a display alarm and a lighted alarm.

26. An automated fault diagnosis system as claimed in claim 24 wherein said statistical characteristic calculator is coupled to said operator interface and includes means for manually assigning alarm thresholds for predetermined engine events for each engine operating condition.

27. An automated fault diagnosis system as claimed in claim 24 including a data transmission unit, coupled to said alarm unit, to send the unique alarm to a remote location away from said engine.

28. An automated fault diagnosis system as claimed in claim 24 wherein said computerized diagnostic system includes an alarm log to store said unique alarm with chronologic data and corresponding engine event data and current operating condition of said engine.

29. An automated fault diagnosis system as claimed in claim 28 wherein said display and operator interface includes a data retrieval unit for displaying, upon operator command via said operator interface, said unique alarm and logged chronologic data and corresponding engine event and logged operating condition of said engine.

30. An automated fault diagnosis system as claimed in claim 29 including a lamp, near said engine and coupled to said alarm unit, providing an illuminated alarm upon issuance of said unique alarm.

31. An automated fault diagnosis system as claimed in claim 24 wherein said statistical characteristic calculator and said monitor process respective vibration signals for each phase angle window via said processor and store, in said memory stores, the calculated statistical characteristics for respective vibration signals per phase angle window and the assigned alarm thresholds.

32. An automated fault diagnosis system as claimed in claim 24 wherein said reciprocating, multiple cylinder engine includes a crankcase and the automated fault diagnosis system includes:

a flow measurement device mounted on said engine crankcase, said flow measurement device generating a crankcase gas flow representative signal;

said statistical characteristic calculator, coupled to said flow measurement device and receiving said crankcase gas flow representative signal in said baseline data acquisition mode, calculating statistical characteristics for respective crankcase flow signals corresponding to each engine operating condition and assigning combustion flow alarm thresholds for said respective crankcase flow signals for each engine operating condition; and, said monitor coupled to said flow measurement device and acquiring, in said monitoring mode, respective crankcase flow signals and matching a current engine operating condition of said engine with one of said plurality of engine operating conditions; and, said alarm unit having a combustion flow alarm module issuing a combustion flow alarm when said respective crankcase flow signals for the matching engine operating condition exceeds said combustion flow alarm threshold.

33. An automated fault diagnosis system as claimed in claim 24 wherein said reciprocating, multiple cylinder engine includes a manifold and the automated fault diagnosis system includes:

an engine cylinder exhaust temperature sensor mounted on or adjacent said manifold and generating a representative engine exhaust temperature signal;

said statistical characteristic calculator, coupled to said engine exhaust temperature sensor, receiving said engine exhaust temperature signal, calculating statistical characteristics for respective engine exhaust temperature signals corresponding to each engine operating condition and assigning engine exhaust temperature alarm thresholds for said respective engine exhaust temperature signals for each engine operating condition based upon the corresponding statistical characteristics therefor; and, said monitor acquiring respective engine exhaust temperature signals and matching a current engine operating condition of said engine with one of said plurality of engine operating conditions; and, said alarm unit having an engine exhaust temperature alarm module issuing an engine exhaust temperature alarm when said respective engine exhaust temperature signals for the matching engine operating condition exceed said engine exhaust temperature alarm thresholds.

34. An automated fault diagnosis system as claimed in claim 24 wherein said reciprocating, multiple cylinder compressor includes a suction manifold and a discharge manifold; and the automated fault diagnosis system includes:

a plurality of suction and discharge temperature sensors mounted on said suction manifold for each compressor stage, a respective suction and discharge temperature sensor sensing the corresponding temperature for a respective compressor stage, each manifold suction and discharge temperature sensor generating a representative manifold suction and discharge temperature signal;

a plurality of suction pressure sensors and discharge pressure sensors respectively mounted on said suction manifold and said discharge manifold for each compressor stage, each suction pressure sensor and discharge pressure sensor sensing the corresponding suction pressure and discharge pressure for a respective compressor stage and generating representative suction pressure signals and discharge pressure signals therefor;

a speed sensor for said compressor;

said statistical characteristic calculator, coupled to said suction and discharge temperature sensors, said suction pressure sensors and discharge pressure sensors and receiving said representative signals thereof in said baseline data acquisition mode, calculating and storing baseline data for a plurality of operating compressor conditions other than start-up and shut-down compressor operating conditions with respect to:

capacity per stage, brake horsepower, brake horsepower per unit volume throughput period per stage, and total capacity and total brake horsepower per unit volume throughput period for said compressor, based upon predetermined mathematical algorithms and compressor manufacturer's loading curves, compressor models and preexisting data relative to said compressor and said manifold suction and discharge temperature signals for each stage, suction pressure signals for each stage, discharge pressure signals for each stage, and speed signals; and, a chronologic data log module, coupled to said statistical characteristic calculator and said memory stores, for storing at least:

brake horsepower, brake horsepower per unit volume throughput period per stage, and total capacity and total brake horsepower per unit volume throughput period for said compressor, corresponding to said each compressor operating condition.

35. An automated fault diagnosis system as claimed in claim 34 including said statistical characteristic calculator calculating statistical characteristics for compressor performance based upon said total brake horsepower per unit volume throughput period for each compressor operating condition and assigning compressor performance alarm thresholds for compressor performance for each compressor operating condition; and, said monitor acquiring:

said manifold suction and discharge temperature signals for each stage, suction pressure signals for each stage, discharge pressure signals for each stage, and speed signals, and, matching a current compressor operating condition with one of said plurality of compressor operating conditions; and, said alarm unit having a compressor performance alarm module issuing a compressor performance alarm when said respective compressor performance for the matching operating condition exceed said compressor performance alarm thresholds.

36. An automated fault diagnosis system as claimed in claim 35 wherein said reciprocating, multiple cylinder engine is supplied with fuel and said engine has a predetermined fuel consumption rate and data is provided representative of cost of said fuel, and the automated fault diagnosis system includes:

a fuel flow sensor for said fuel supplied to said engine generating fuel flow signals representative thereof, said statistical characteristic calculator, in conjunction with said processor, memory stores, display and operator interface, calculating, storing and, upon operator input, displaying brake horsepower fuel consumption based upon a predetermined correlation between the total compressor brake horsepower and the fuel flow rate from said fuel flow signals.

37. An automated fault diagnosis system as claimed in claim 35 wherein said reciprocating, multiple cylinder compressor includes compressor valves having compressor valve events and the automated fault diagnosis system includes:

a plurality of vibration sensors for said compressor, a single vibration sensor mounted on a respective compressor cylinder of said multiple cylinder compressor, generating respective compressor vibration signals for each respective compressor cylinder;

a compressor phase angle sensory system for detecting a second plurality of predetermined phase angle windows about crankshaft angular positions for a corresponding plurality of predetermined compressor valve events;

said statistical characteristic calculator, coupled to the compressor vibration sensors and compressor phase angle sensory system and receiving said compressor vibration signals and plurality of predetermined phase angle windows for said compressor valve events, calculating statistical characteristics for respective compressor vibration signals per phase angle window corresponding to said predetermined compressor valve events for each compressor operating condition of said plurality of compressor operating conditions and assigning compressor valve alarm thresholds for said respective compressor vibration signals per phase angle windows corresponding to said predetermined compressor valve events for each operating condition based upon the corresponding statistical characteristics therefor; and, said monitor acquiring respective compressor vibration signals for said corresponding phase angle window and matching a current compressor operating condition with one of said plurality of compressor operating conditions; and, said alarm unit having a compressor valve alarm module issuing a compressor alarm unique to one of said plurality of predetermined compressor events when said respective compressor vibration signal corresponding to said compressor event for the matching compressor operating condition exceeds said compressor valve alarm threshold.

38. An automated fault diagnosis system as claimed in claim 24 wherein said reciprocating, multiple cylinder engine includes an ignition diagnostics system controlling said engine and outputting a signal representative of ignition diagnostics, and the automated fault diagnosis system includes:

said statistical characteristic calculator, coupled to the ignition diagnostics system and receiving said ignition diagnostics signal for each engine cylinder, calculating statistical characteristics for respective ignition diagnostics for each engine operating condition of said plurality of engine operating conditions and assigning ignition diagnostics alarm thresholds for said respective ignition diagnostics signals for each engine operating condition based upon the corresponding statistical characteristics therefor; and, said monitor acquiring respective ignition diagnostics signals and matching a current engine operating condition with one of said plurality of engine operating conditions; and, said alarm unit having an ignition diagnostics alarm module issuing an ignition diagnostics alarm when said respective ignition diagnostics signal corresponding to said matching engine operating condition exceeds said ignition diagnostics alarm threshold.

* * * * *